United States Patent
Seas et al.

(10) Patent No.: US 7,323,987 B2
(45) Date of Patent: Jan. 29, 2008

(54) COMPACT SINGLE LENS LASER SYSTEM FOR OBJECT/VEHICLE PRESENCE AND SPEED DETERMINATION

(75) Inventors: Antonios Seas, Ellicott City, MD (US); Christopher Field, Baltimore, MD (US); J. Marcos Sirota, Takoma Park, MD (US)

(73) Assignee: Sigma Space Corporation, Lanham, MD (US)

( * ) Notice: Subject to any disclaimer, the term of this patent is extended or adjusted under 35 U.S.C. 154(b) by 218 days.

(21) Appl. No.: 11/150,748

(22) Filed: Jun. 10, 2005

(65) Prior Publication Data

US 2005/0285738 A1 Dec. 29, 2005

Related U.S. Application Data

(63) Continuation-in-part of application No. 11/118,540, filed on Apr. 29, 2005.

(60) Provisional application No. 60/583,559, filed on Jun. 28, 2004.

(51) Int. Cl.
   *G08B 13/18* (2006.01)
(52) U.S. Cl. .............................. 340/557; 340/907
(58) Field of Classification Search ................ 340/557, 340/907, 435, 436, 904; 356/5.01, 28, 613, 356/4.01; 246/106, 115; 73/511
   See application file for complete search history.

(56) References Cited

U.S. PATENT DOCUMENTS

| | | | | |
|---|---|---|---|---|
| 3,532,886 A | | 10/1970 | Kruger, Jr. et al. | 250/83.3 |
| 3,623,057 A | * | 11/1971 | Hedin et al. | 340/557 |
| 4,690,550 A | * | 9/1987 | Kuhne | 356/5.01 |
| 5,066,950 A | | 11/1991 | Schweitzer et al. | 340/937 |
| 5,227,784 A | * | 7/1993 | Masamori et al. | 340/903 |
| 5,321,490 A | | 6/1994 | Olson et al. | 356/5 |
| 5,546,188 A | | 8/1996 | Wangler et al. | 356/376 |
| 5,680,120 A | * | 10/1997 | Tilleman | 340/904 |
| 5,757,472 A | | 5/1998 | Wangler et al. | 356/4.01 |
| 5,793,491 A | | 8/1998 | Wangler et al. | 356/376 |

(Continued)

*Primary Examiner*—Anh V. La
(74) *Attorney, Agent, or Firm*—Pillsbury Winthrop Shaw Pittman LLP

(57) ABSTRACT

A compact system for determining the presence and speed of an object/vehicle, and its application for Red Light Camera photo-enforcement is disclosed. The disclosed system uses accurate timing, laser radiation in the form of optical pulses, and the scattering effect of optical pulses from the road or vehicle surface to determine the presence of a vehicle, and estimate its speed. The system can determine whether an object/vehicle is present at a specific location, estimate its height, and in the case that the object/vehicle is moving, the system can estimate its speed. Combining the disclosed technology with commercially available digital recording techniques and equipment, a traffic photo-enforcement system can be constructed. The system is capable of monitoring traffic in an intersection/highway, measure vehicle speed, identify potential traffic violations, and trigger a visual recording device such as a camera or video system for documenting a violation. The system can serve as a tool by law enforcement agencies and research groups for other applications, such as measurement of traffic density, monitor vehicle speed, and the study of traffic patterns. Other important information that can be generated from the disclosed system is the profile of a moving object/vehicle, the length of the moving object/vehicle, and whether the moving object/vehicle was accelerating or decelerating. Further analysis of the recorded data can yield information relevant to the make and model of the passing vehicles.

28 Claims, 23 Drawing Sheets

U.S. PATENT DOCUMENTS

| | | | |
|---|---|---|---|
| 5,896,190 A | 4/1999 | Wangler et al. | 356/4.01 |
| 6,111,523 A | 8/2000 | Mee | 340/937 |
| 6,188,469 B1 | 2/2001 | Liou et al. | 356/28 |
| 6,351,208 B1 | 2/2002 | Kaszczak | 340/425.5 |
| 6,366,219 B1 | 4/2002 | Hoummady | 340/907 |
| 6,373,402 B1 | 4/2002 | Mee | 340/937 |
| 6,404,506 B1 | 6/2002 | Cheng et al. | 356/634 |
| 6,466,260 B1 | 10/2002 | Hatae et al. | 348/149 |
| 6,546,119 B2 | 4/2003 | Ciolli et al. | 382/104 |
| 6,573,929 B1 | 6/2003 | Glier et al. | 348/149 |
| 6,614,536 B1 | 9/2003 | Doemens et al. | 356/601 |
| 2002/0012534 A1 | 1/2002 | Kibayashi et al. | 396/205 |
| 2002/0054210 A1 | 5/2002 | Glier et al. | 348/149 |
| 2002/0141618 A1 | 10/2002 | Ciolli et al. | 382/104 |
| 2002/0186297 A1 | 12/2002 | Bakewell | 348/118 |
| 2003/0020633 A1 | 1/2003 | Lee | 340/907 |
| 2003/0080878 A1 | 5/2003 | Kirmuss | 340/936 |

\* cited by examiner

COMPACT SINGLE LENS LASER SYSTEM FOR OBJECT/VEHICLE PRESENCE AND SPEED DETERMINATION

CROSS REFERENCE TO RELATED APPLICATIONS

This application is based upon and claims benefit of now abandoned co-owned U.S. Provisional Patent Application Ser. No. 60/583,559 entitled "System and Method for Traffic Monitoring, Speed Determination, and Traffic Light Violation Detection and Recording," filed with the U.S. Patent and Trademark Office on Jun. 28, 2004 by the inventors herein, and is a continuation-in-part of now abandoned co-owned U.S. patent application Ser. No. 11/118,540, entitled "System and Method for Traffic Monitoring, Speed Determination, and Traffic Light Violation Detection and Recording", filed with the U.S. Patent and Trademark Office on Apr. 29, 2005 by the inventors herein, the specifications of which are included herein by reference.

BACKGROUND OF THE INVENTION

1. Field of the Invention

This invention relates to a system and method for detecting the presence of an object and more particularly the invention relates to a single lens laser system for monitoring and recording the activity of traffic in a controlled intersection.

SUMMARY OF THE INVENTION

A system and method for traffic monitoring, vehicle speed determination and traffic light violation detection and recording is disclosed. In a preferred embodiment of the invention, the system and method are capable of monitoring traffic in an intersection/highway, measure vehicle speed, identify potential traffic violations, and trigger a visual recording device such as a camera or video system. The method and system can also serve as a tool for use by law enforcement agencies and research groups for other applications such as measurement of traffic density, monitoring vehicle speed, and studying traffic patterns. One of the potential applications of the system is to monitor and record red light violations. The disclosed system relies on eye-safe laser radiation and scattering of such radiation off the road surface to determine the presence of a car, estimate its speed, determine when a violation is likely to occur (based on predetermined criteria), and trigger a recording mechanism for collecting evidence of the violation.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION

The invention summarized above and defined by the enumerated claims may be better understood by referring to the following description, which should be read in conjunction with the accompanying drawings. This description of an embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1A:
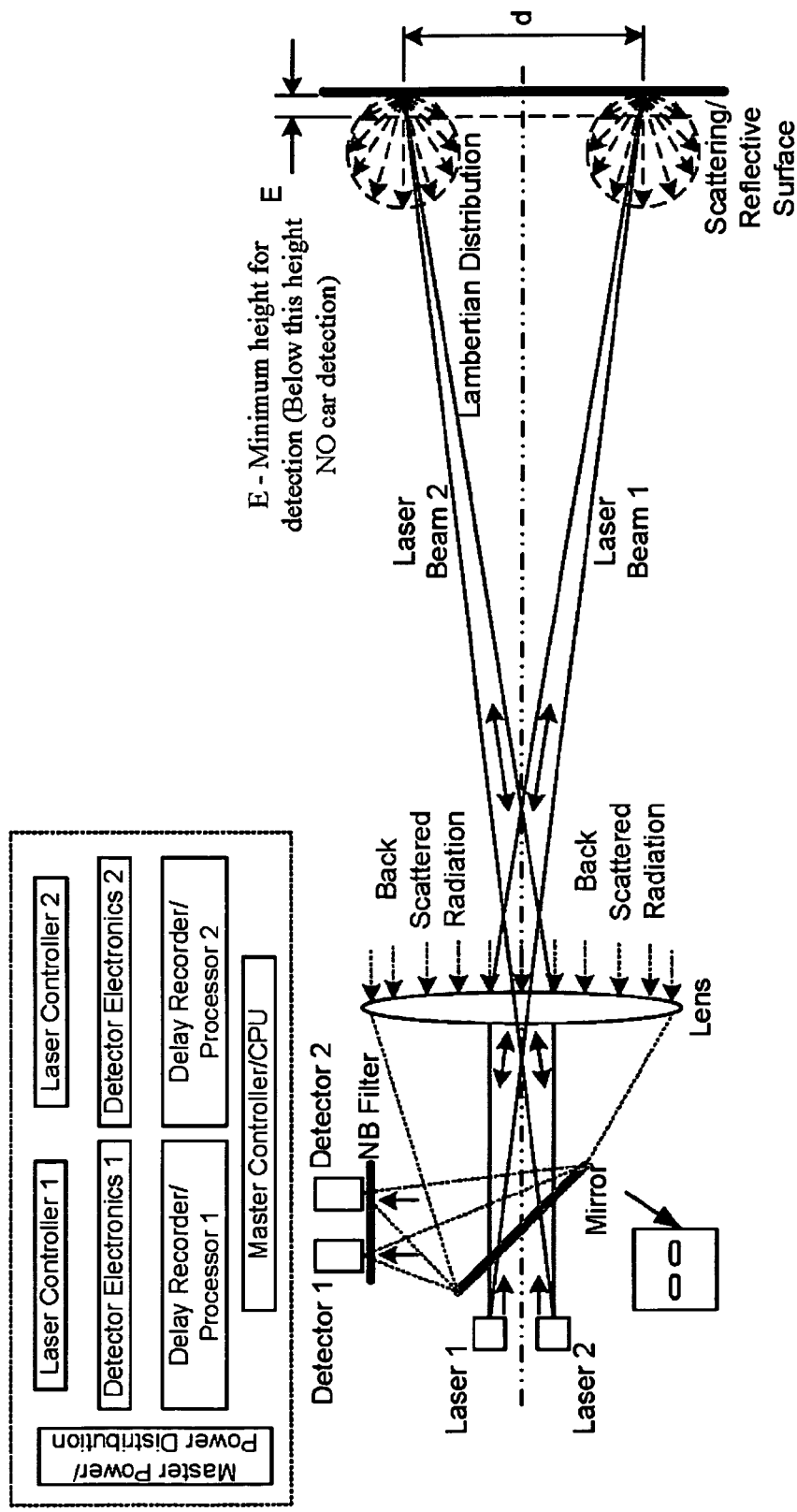
FIG. 1(a) is a schematic drawing of main parts and overall arrangement of a Single Lens Laser system according to a first embodiment of the present invention.
Figure 1B:
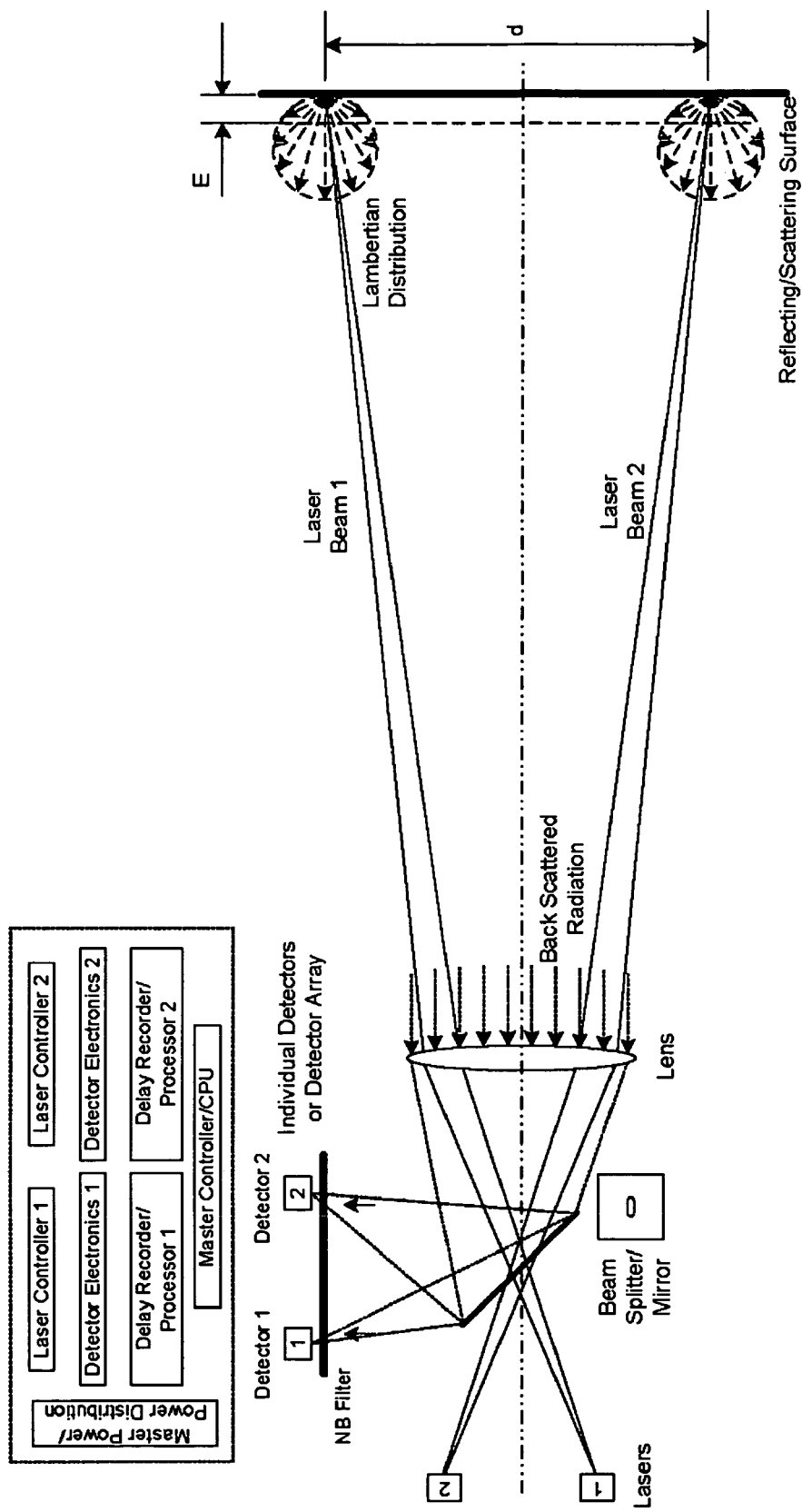
FIG. 1(b) is a schematic drawing of main parts and overall arrangement of a Single Lens Laser system according to another embodiment of the present invention.

FIGS. 1(a) and (b) show the main parts and overall arrangement of a single lens sensor system according to the present invention. The sensor system includes at least a pair of laser outputs (preferably diode lasers for compactness), an array of detectors having at least two detectors, a lens, a mirror (or beam splitter), and several electronic boards for power conditioning and distribution, information recording, and decision-making. In FIG. 1(a), there are two holes in the mirror (beam splitter), one for each of two laser beams, to allow the beams from the lasers to pass through. In FIG. 1(b), a single hole is located in the center of the mirror and the lasers are configured such that both laser beams pass through the same aperture in the middle of the mirror.

The laser with its associated laser controller generates short pulses at high frequency. The duration of the optical pulses and the repetition frequency are a function of the desired accuracy, and can be adjusted according to the needs of the specific application. Short optical pulses in conjunction with high frequency lead to high accuracy in evaluating vehicle/object speed and other information from recorded data. Reducing the frequency or increasing the pulse width decreases system accuracy. Another factor that affects the system accuracy is the separation d between the laser beams, described in more detail below. The beam separation can serve as an accuracy adjustment in order to satisfy requirements for specific applications.

The optical principle that provides the basis for operation of the disclosed system is scattering of optical radiation when it encounters a solid surface. It is always true that a small percentage of incident optical radiation on a surface (interface) will be scattered in many directions in addition to the other optical phenomena, such as reflection and refraction. This is also true for shiny surfaces since a short exposure to open air will contaminate the surface enough to enable light scattering. The disclosed system relies on a small percentage of scattered optical radiation to be detected and to generate an electrical signal through the use of a sensitive optical detector. The generated electrical signal is, in turn, used to trigger electronic processes and logic algorithms that enable the system to detect the presence of an object/vehicle.

Figure 2:
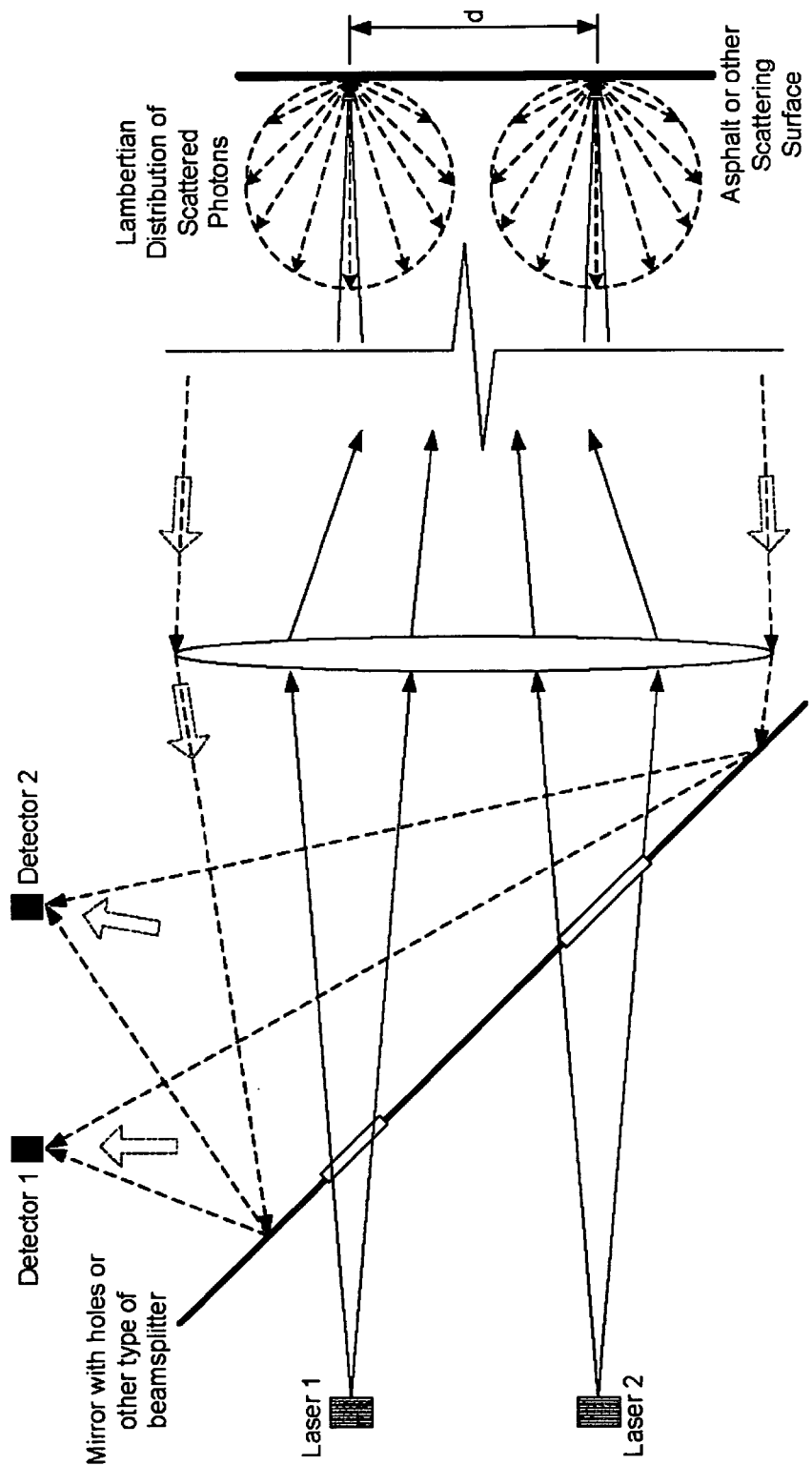
FIG. 2 shows a principle of operation of a single lens system according to the present invention.

The schematic in FIG. 2 provides more details of the basic optical principles that enable the operation of the disclosed single lens sensor system. In the embodiment of FIG. 2, two lasers generate optical radiation that is directed through one or more apertures on the mirror (beam splitter). In the special case that diode lasers are used (which are more divergent than traditional lasers), the hole(s) on the mirror also serve as specialized apertures to control and/or shape the beam profile. Another function of the apertures may be to limit the maximum output optical radiation to Class I level that is considered to be eye-safe. A dielectric coated beam splitter can also be used instead of a mirror with holes. Next, the optical radiation travels through the lens and is focused onto the desired surface. In the case of a traffic system, the lasers are focused onto or above the asphalt surface. After hitting the surface, the optical radiation is scattered in all directions as shown in FIG. 2, where it is assumed that the distribution of the scattered radiation has a Lambertian profile. A small portion of the scattered photons follows exactly the opposite direction (as compared to their initial direction before being scattered) and are collected by the lens. The lens, with the aid of the mirror (beam splitter), focuses all collected optical radiation onto one or more detectors. It is important to note that most of the return photons are deflected by the mirror and focused onto the detectors rather than going through the mirror hole(s). This is due to the fact that the returned photons are spread throughout the lens surface.

The assumption of Lambertian distribution for the scattered radiation further suggests that it is advantageous to position the single lens system in such a way as to minimize the angle of incidence on the scattering/reflective surface. The angle of incidence is defined as the angle between the beam direction and the perpendicular to the scattering surface at the point of contact.

As is the case with many optical systems, it is possible to interchange the position of the lasers and the detectors provided that the mirror (beam splitter) instead of having holes for the beam to go through, it will have one or more areas of high reflectivity for the beams to be reflected.

The overall principle of operation of the single lens sensor system and the various functions that can be performed to estimate the speed of an object/vehicle are outlined below:

1. Electronic boards controlling the lasers provide direct current modulation to the diode laser resulting in the generation of short optical laser pulses. The duration of the laser pulses is in the order of few nanoseconds (4 ns pulses were used during experimental verification of the disclosed system) while the frequency of the pulses is in the order of few kHz, (a pulse repetition rate of 10 kHz was used during experiments). As previously noted, the accuracy of the sensor is a function of the pulse duration, the frequency of pulses or pulse repetition rate, and the laser beam separation on the scattering/reflective surface.

2. The laser beams travels through the mirror hole(s) (as shown in FIGS. 1(a) and (b)) and are focused on or above the surface under surveillance using the single lens. The size of the holes (apertures) may be chosen such that only eye safe radiation levels are allowed through for maximum diode forward current.

3. Before the optical pulses leave the system assembly, a small portion is directed towards the detectors. The signals generated are used to trigger corresponding delay counters dedicated to measure how long it takes before the optical pulses return back to the system after they have been scattered by the surface. Triggering can also be derived from the modulation signal provided to the diode laser.

4. When the laser pulses encounter a surface, several phenomena can take place such as reflection, refraction, and scattering. Unless the surface is extremely smooth and clean, a small part of the incident radiation scatters in all directions. Part of the scattered optical radiation travels exactly the opposite direction as compared to the initial beam direction, and is collected by the lens that focuses incoming light onto the image plane where the detectors are located.

Figure 3:
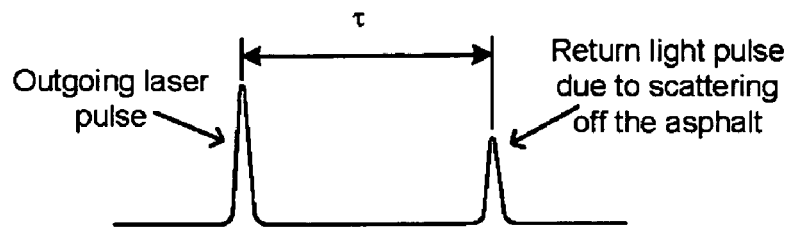
FIG. 3 illustrates the time delay for estimating the range between the disclosed system and the ground.

5. When the collected optical radiation reaches the detectors, electrical signals are generated that trigger the delay counters to stop counting. The time delay between the outgoing laser pulse and the collected scattered radiation is recorded. This is the information needed to estimate the range between the system and the scattering surface. The range is estimated using the expression:

$$r = c\frac{\tau}{2} \quad (1)$$

where:
c—the speed of light (approximately 300,000 km per second); and
τ—the time delay (see FIG. 3).
Note that the recorded time delay, τ, is divided by 2 in the expression above. This is done since the recorded time delay corresponds to the round trip.

Figure 4:
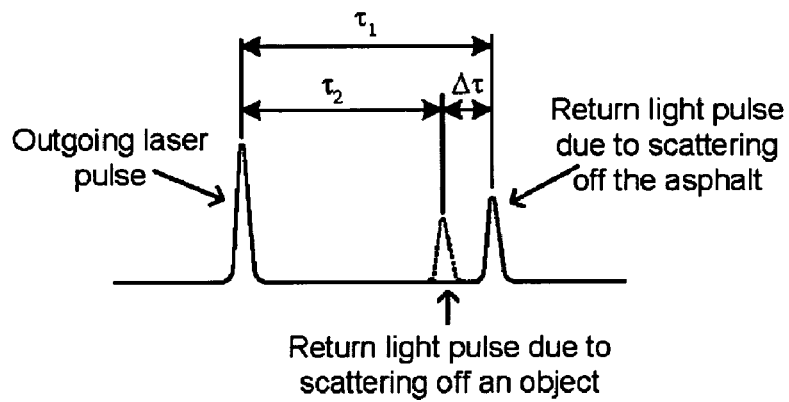
FIG. 4 illustrates the time delay for estimating the range between the disclosed system and an object.

6. In the case that a vehicle/object intersects the laser beam instead of the road surface, a shorter delay is recorded. The height of the vehicle/object can then be estimated using the expression:

$$h = c\left(\frac{\tau_1 - \tau_2}{2}\right) = c\frac{\Delta\tau}{2} \quad (2)$$

where:
Δτ—the difference between the time delay corresponding to the asphalt surface and the time delay corresponding to the object's surface (see FIG. 4).

Figure 6:
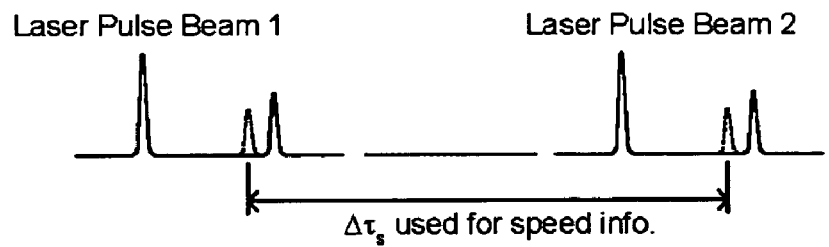
FIG. 6 illustrates the time delay for estimating the speed of a moving object according to a first embodiment of the present invention.
Figure 5:
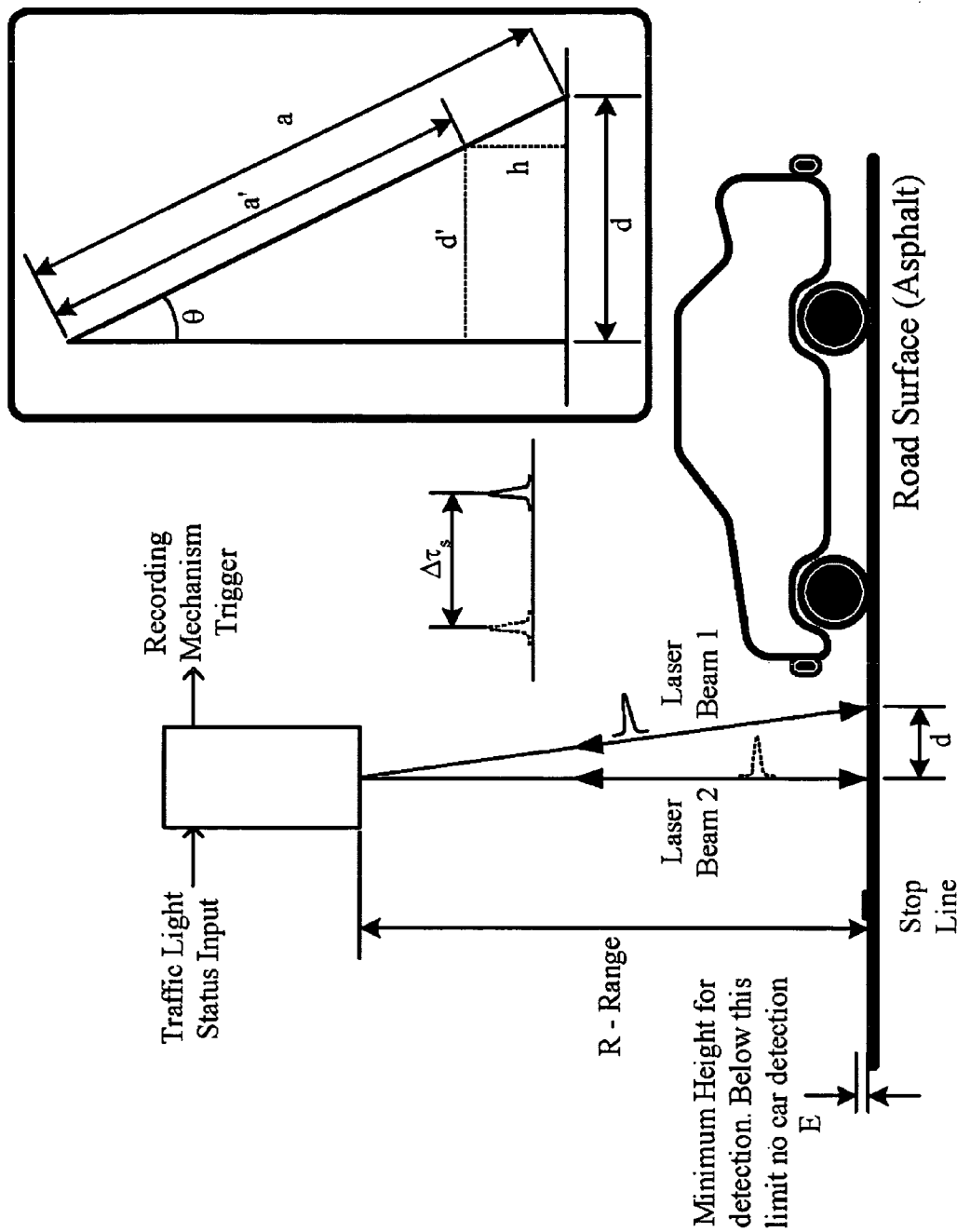
FIG. 5 illustrates a schematic of the detection system according to a first embodiment of the present invention.

7. In the case that the speed of a moving object is needed, the time delay between the first pulse of "Laser beam 1" interrupted by the object's surface and the first pulse of "Laser beam 2" interrupted by the moving object, $\Delta\tau_s$, needs to be measured. This is schematically shown in FIG. 5, where it is assumed that an object is moving from laser beam 1 to laser beam 2. The speed of the moving object can be estimated using the expression:

$$v = \frac{d}{\Delta\tau_s} \quad (3)$$

where:
d—Beam separation; and
$\Delta\tau_s$—time delay between the first pulse of "Laser beam 1" interrupted by the object's surface and the first pulse of "Laser beam 2" interrupted (see FIG. 6).

Speed estimation can be carried out using a variety of methods. The simplest and most straightforward method is the one previously described where the time between the first interruption of laser beam 1 to the first interruption of laser beam 2 is recorded. Given that the beam separation is fixed and can be measured (or estimated), then the speed of the moving vehicle can be estimated. Due to the fact that one of the two laser beams is inclined, rather than vertical, there is an uncertainty associated with the speed estimate. The source of the uncertainty is the accuracy of measuring the delay for the return pulse, which is typically a few picoseconds. The problem is schematically illustrated in the insert of FIG. 5. The laser beam separation when the bumper of a vehicle of height h intersects the beam path is d'. In order to estimate d' (which is the beam separation needed to estimate the vehicle speed) first the range a' is estimated by multiplying the speed of light with the measured pulse delay time. The beam separation at the height of the bumper is estimated using the relation, sin(θ)=d'/a'. (The angle θ is a design parameter, and it can be accurately measured.) Improvements in the measuring accuracy of the time delay minimize errors associated with estimating the bumper height and the speed accuracy of the disclosed sensor.

Another method for estimating the speed of a moving object/vehicle is by recording the range corresponding to every optical pulse return. By subtracting the recorded range values from the range corresponding to the asphalt surface, the height profile of the vehicle can be generated. In the case of inclined laser beams the height of the vehicle will be estimated from the range difference (a-a') and the beam angle (θ) through the cosine relationship h=(a-a')cos(θ). (See insert of FIG. 5.) Performing a cross-correlation analysis on the generated height profiles can then generate an accurate speed estimate. The cross-correlation analysis may be formulated to consider the possibility of acceleration and deceleration during the recording. The result of this analysis will be a better estimate of the time delay ($\tau_s$) that it takes for the vehicle to cross laser beam 1 and laser beam 2. Another option is to perform the cross-correlation analysis only on carefully selected sections of the vehicle instead of the whole vehicle profile.

Figure 7:
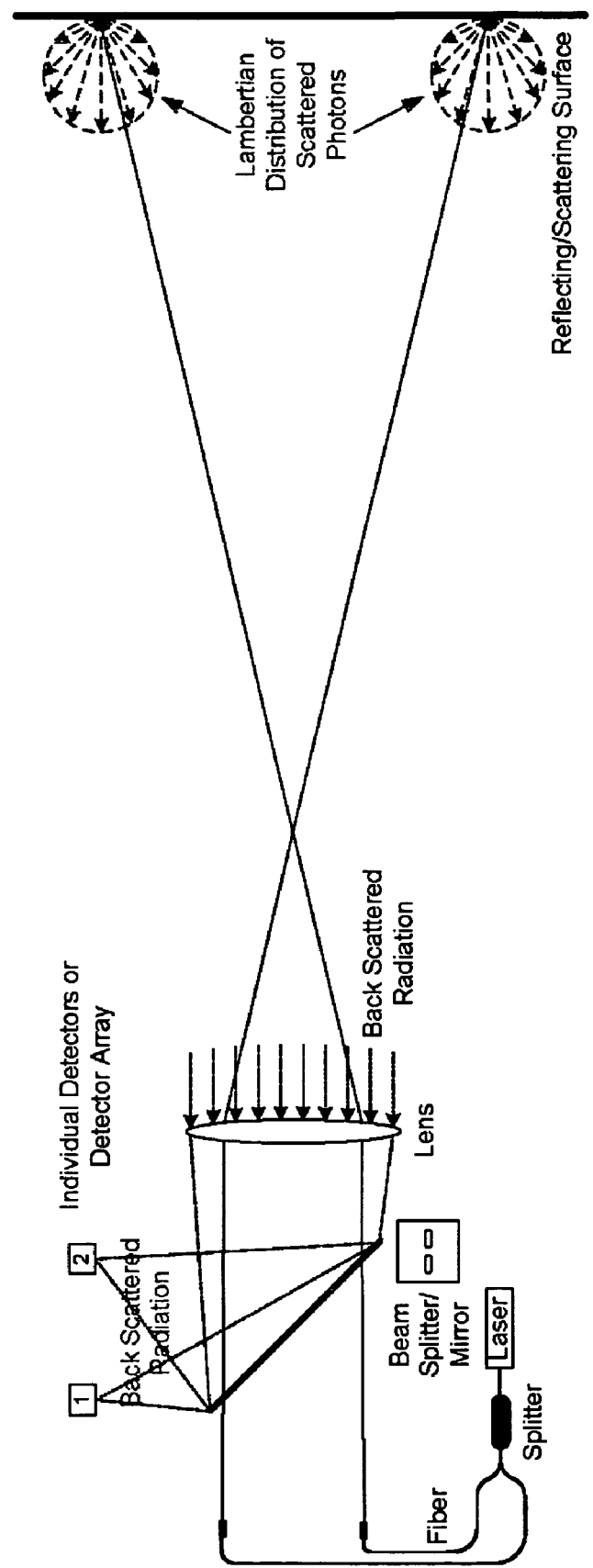
FIG. 7 illustrates a Single Lens Laser system based on one laser and a beam splitter with two holes.
Figure 8:
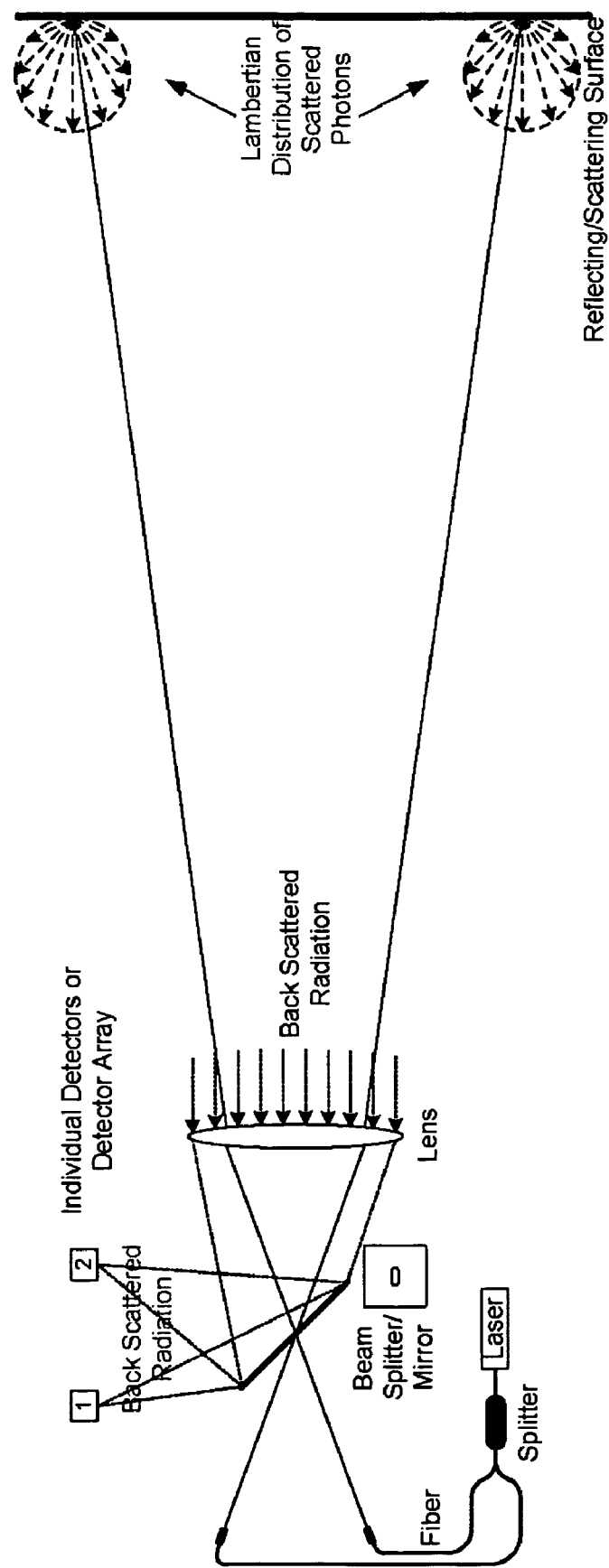
FIG. 8 illustrates a Single Lens Laser system based on one laser and a beam splitter with only one hole.
Figure 9:
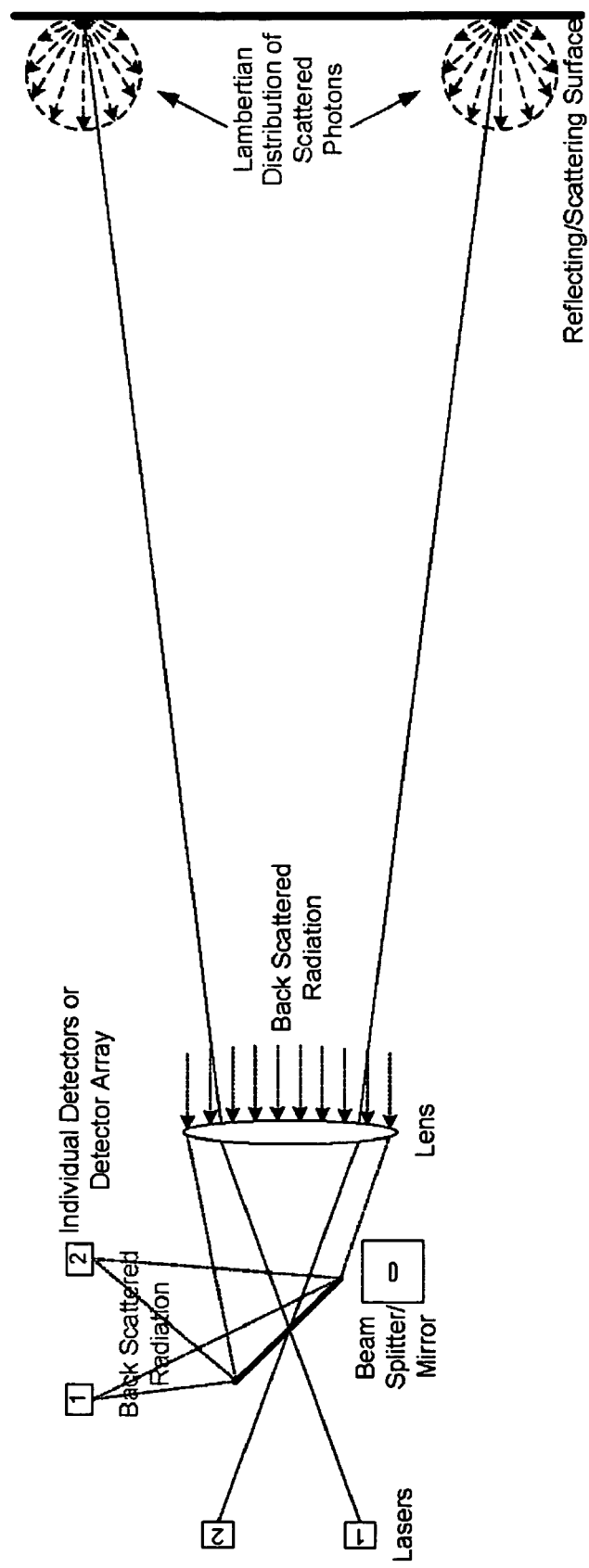
FIG. 9 illustrates a Single Lens Laser system based on two lasers and a beam splitter with only one hole.

There are few alternate optical designs of the single lens two-laser beam sensor system. FIGS. 7-9 display equivalent single lens sensor systems. All systems consist of a single lens, and two detectors (or an array of detectors). The main differences are the number of lasers used, and the number of holes (openings) on the beam splitter (mirror). All proposed architectures offer comparable performance given that the lens is identical in all cases.

Figure 10:
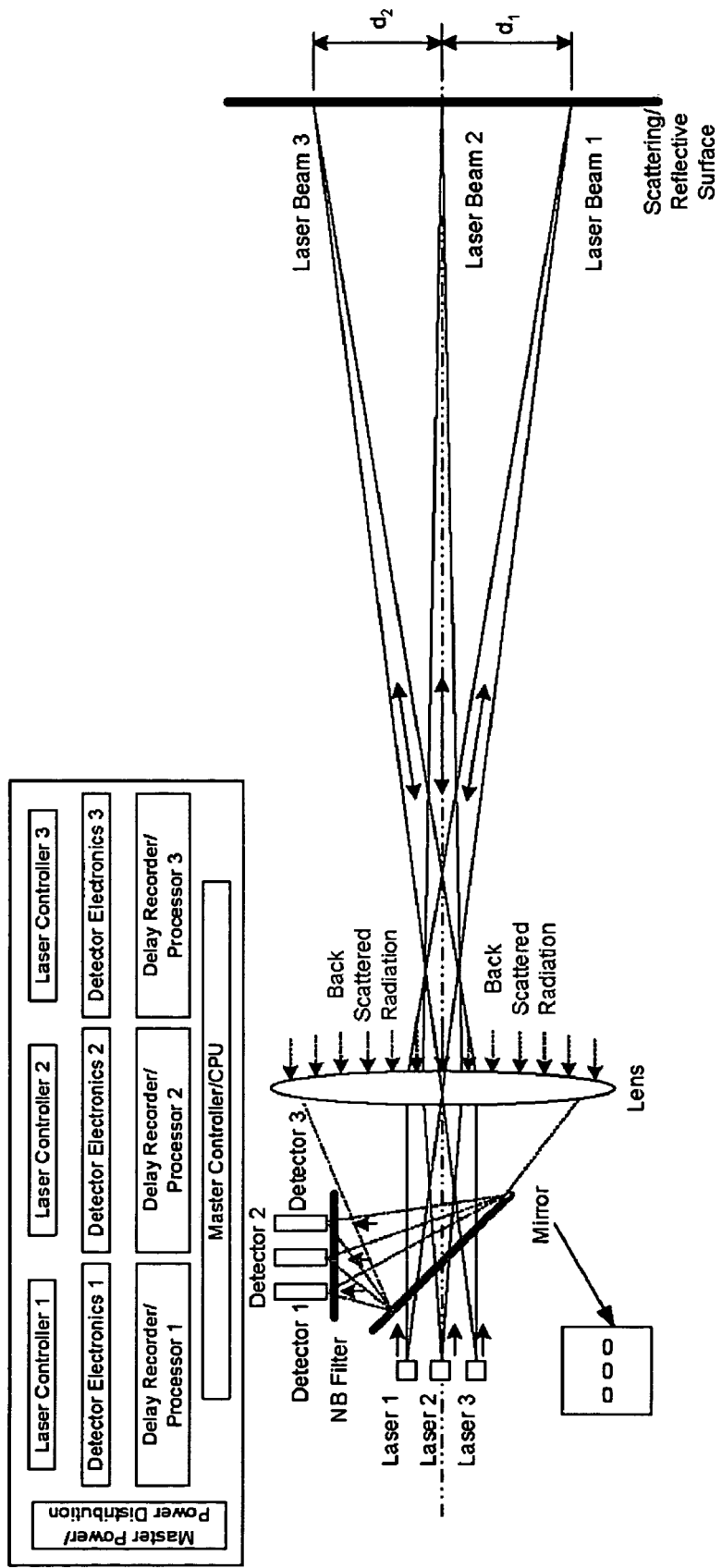
FIG. 10 illustrates details of a three-laser beam Single Lens Laser system according to a second embodiment of the present invention.
Figure 11:
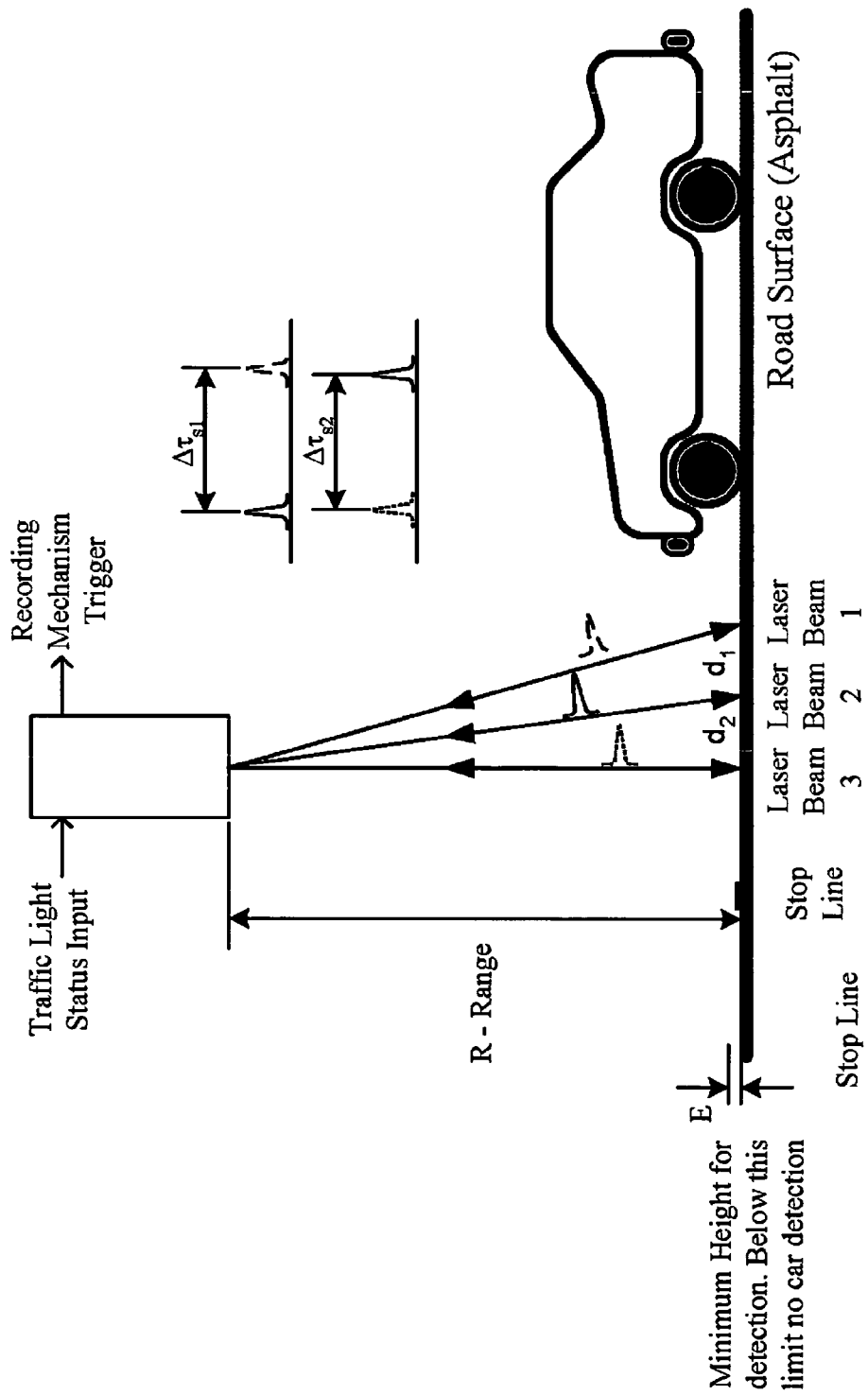
FIG. 11 illustrates a schematic of the detection system for the three-laser beam sensor system according to a second embodiment of the present invention.
Figure 12:
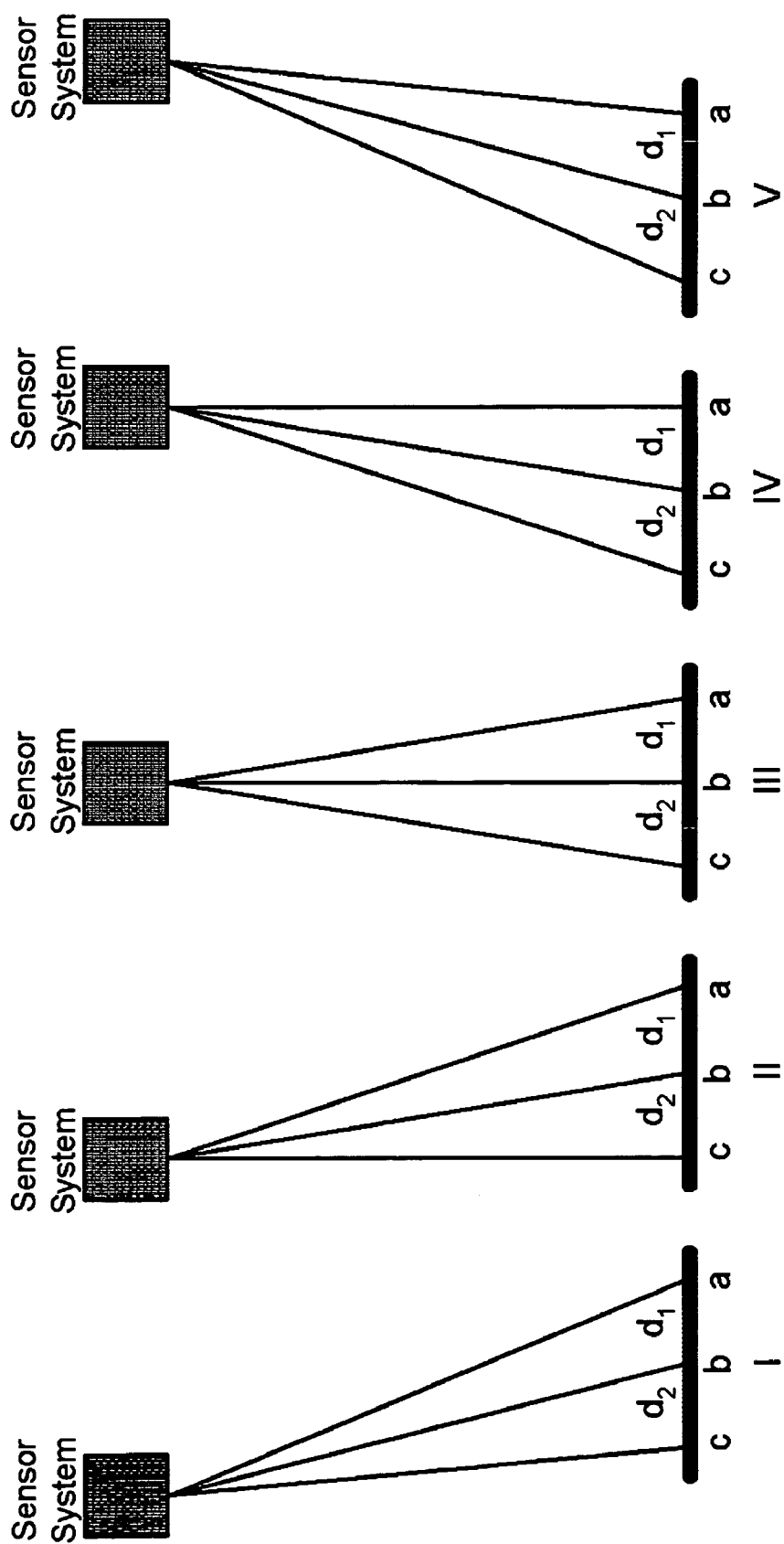
FIG. 12 illustrates possible laser beam arrangements for three laser beam sensors according to a second embodiment of the present invention.

A third laser beam can be used through the same focusing/collecting lens to improve the performance of the sensor. The result of adding a third laser beam is that speed accuracy is improved since the three-laser beam arrangement eliminates some uncertainty from speed estimates. Acceleration/deceleration can be evaluated easier and more accurately as compared to the two-laser beam sensor system. This is possible since the front of a passing vehicle generates two speed estimates that can used to estimate the vehicle's acceleration. The main disadvantages of the three-beam design are the added complexity and cost. FIG. 10 displays a three-laser beam sensor. It consists of a lens, a beam splitter with holes, three lasers, and three detectors. The three detectors can be replaced with a single detector array. FIG. 11 illustrates the principle of operation for the three-laser beam sensor system, while FIG. 12 displays various beam arrangements that can be used with the laser beam sensor system. The specific installation environment and application will dictate which of the different beam arrangements is used.

The speed of a moving vehicle can be evaluated in a number of different ways when a three-laser beam sensor system is used. The time delay between a vehicle interrupting laser beam 1 and laser beam 2 is denoted by $\Delta\tau_{s1}$, the time delay between a vehicle interrupting laser beam 2 and laser beam 3 denoted by $\Delta\tau_{s2}$, and the time delay between a vehicle interrupting laser beam 1 and laser beam 3 denoted by $\Delta\tau_{s3}$. The speed of a passing vehicle can be evaluated using one of the following expressions.

$$v_{ab} = \frac{d_1}{\Delta\tau_{s1}} \quad (5)$$

$$v_{bc} = \frac{d_2}{\Delta\tau_{s2}} \quad (6)$$

-continued $$v_{ac} = \frac{d_1 + d_2}{\Delta \tau_{s3}} \quad (7)$$

The acceleration/deceleration of the passing vehicle can be estimated using the expression:

$$\alpha = \frac{\Delta v}{\Delta t} = \frac{v_{bc} - v_{ab}}{\Delta \tau_{s3}} \quad (8)$$

In many cases, an average of the three possible speeds may be desirable. In such a case, the average speed can be estimated using the expression:

$$v = \frac{v_{ab} + v_{bc} + v_{ac}}{3} \quad (9)$$

It is also possible to calculate a weighted speed average. In this case, the three speed measurements are assigned a weight proportional to their expected accuracy (It is expected that $v_{ac}$ will be more accurate as compare to $v_{ab}$ and $v_{bc}$ since it is evaluated using the largest possible beam separation). The weighted speed average can be estimated by the expression:

$$v = Av_{ab} + Bv_{bc} + Cv_{ac} \quad (10)$$

where:

A, B, and C are weighted constants or functions.

The above discussion and equations (5) to (10) correspond to the front of the vehicle when it intercepts the laser beams. Another set of equations can be written considering the rear of the vehicle when it clears the laser beams. Combining the speed estimates for the front and the rear of the vehicle a more complete picture of the vehicle's behavior can be established.

Figure 13:
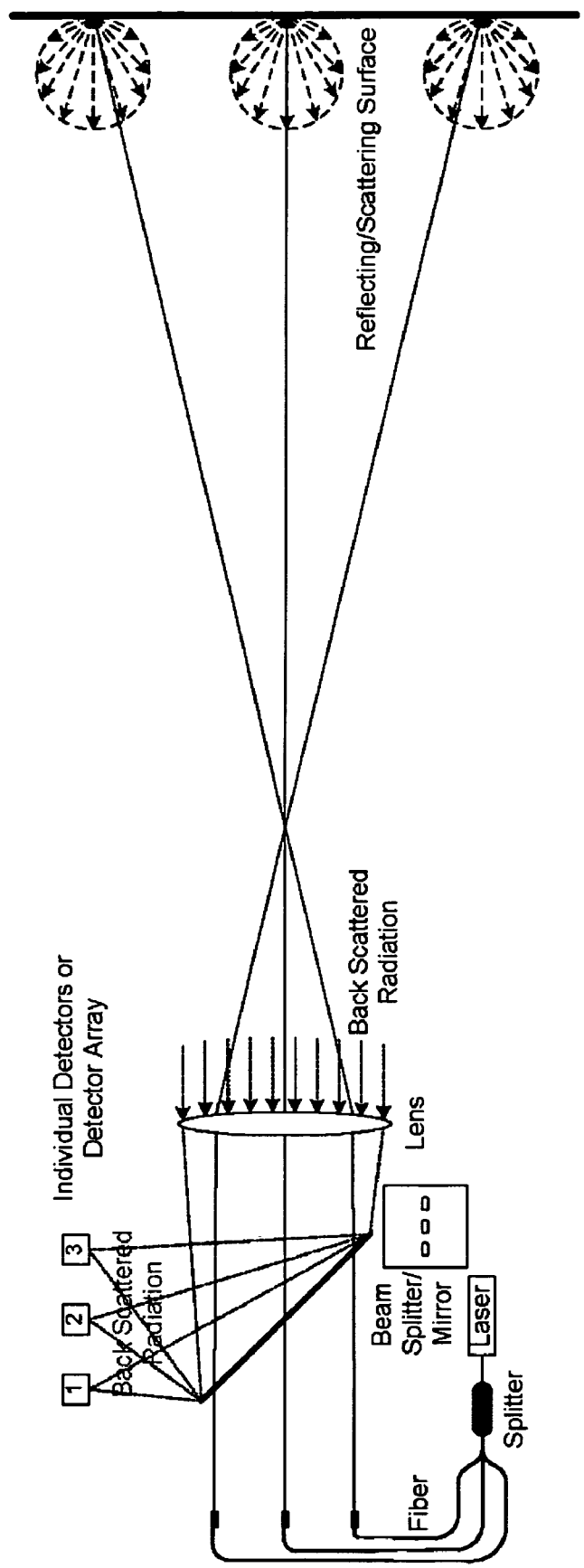
FIG. 13 illustrates a Single Lens Laser system for a three-laser beam sensor system based on only one laser and a beam splitter with three holes.
Figure 14:
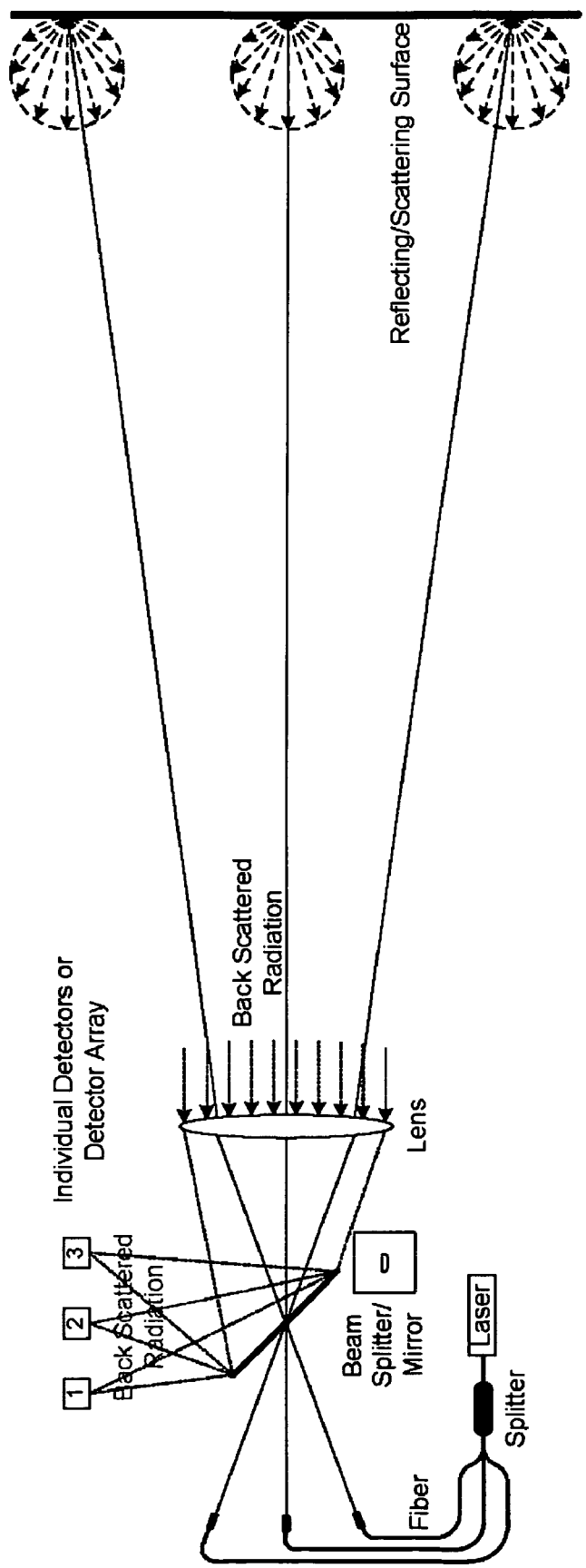
FIG. 14 illustrates a Single Lens Laser system for a three-laser beam sensor system using only one laser and a beam splitter with one hole.
Figure 15:
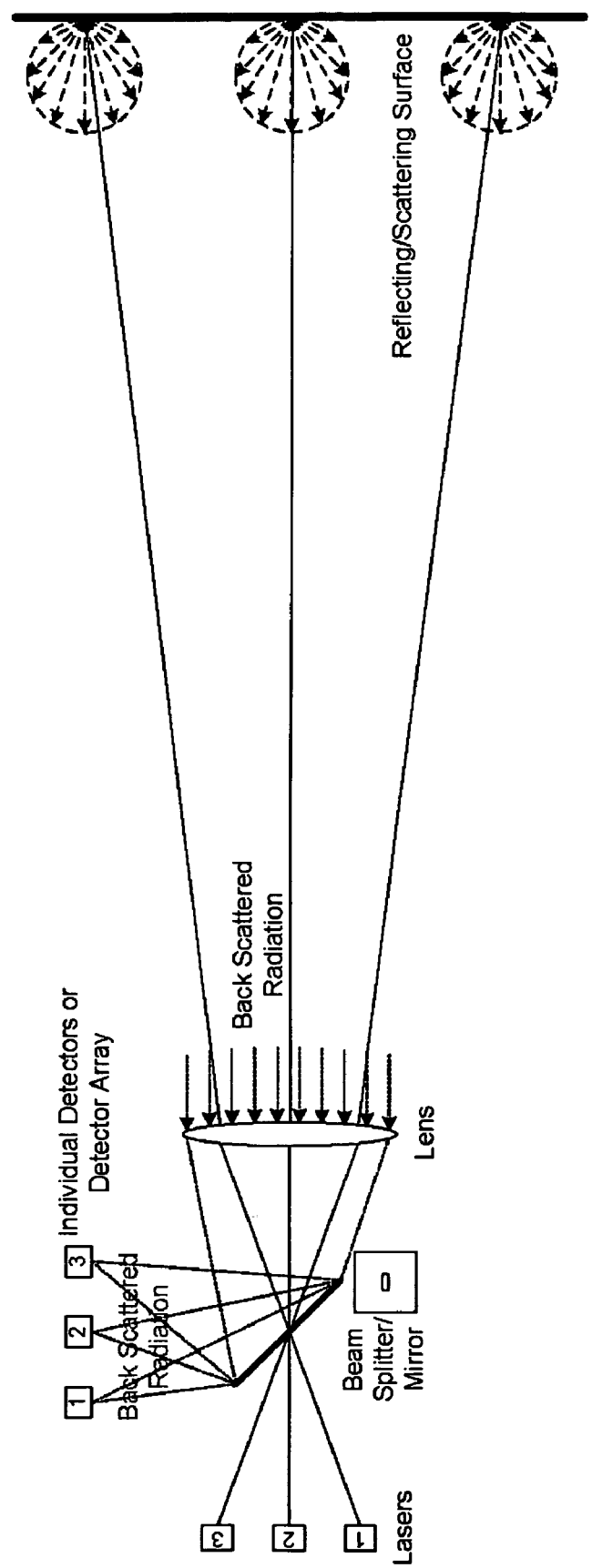
FIG. 15 illustrates a Single Lens Laser system for a three-laser beam sensor system using three individual lasers and a beam splitter with one hole.

Other embodiments of the three-laser beam sensor system are shown in FIGS. 13, 14, and 15. In FIG. 13, the sensor system uses only one fiber-coupled laser that is divided in three parts using a fiber splitter. The three fibers deliver the optical radiation to appropriate positions on the back of the mirror. There are three holes on the mirror for the laser beams to pass through. In FIG. 14, the sensor system uses only one laser, which is split into three beams, and all the laser beams go through one hole in the center of the mirror. Finally, in FIG. 15, the sensor system uses three lasers and all three laser beams go through the same hole on the mirror.

Figure 16:
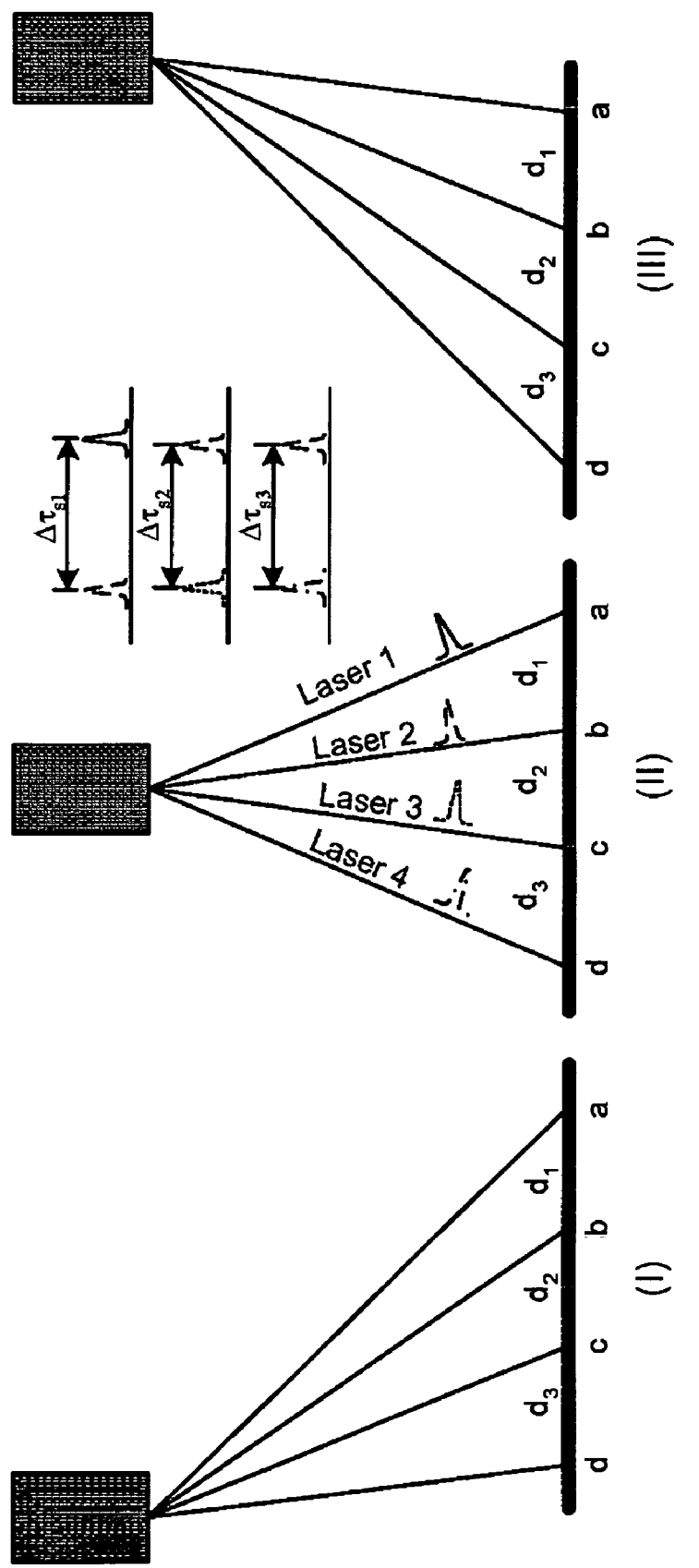
FIG. 16 illustrates possible laser beam arrangements for four laser beam sensors according to another embodiment of the present invention.

Similar to the three-laser beam sensor, in a four-laser beam sensor system, the overall accuracy of the system improves while its complexity and cost increases. The principle of operation of the four-laser beam sensor system is shown in FIG. 16. Various laser beam arrangement can satisfy different design requirements.

In the case of the four-laser beam sensor system, there are three time delays between beam interruptions that can be used to estimate the speed of a passing vehicle. Time delay 1 is the time between a vehicle interrupting laser beam 1 and laser beam 2 ($\Delta \tau_{s1}$), time delay 2 is the time between a vehicle interrupting laser beam 2 and laser beam 3 ($\Delta \tau_{s2}$), and time delay 3 is the time between a vehicle interrupting laser beam 3 and laser beam 4 ($\Delta \tau_{s3}$). The speed of the passing vehicle can be evaluated using one of the following expressions.

$$v_{ab} = \frac{d_1}{\Delta \tau_{s1}} \quad (11)$$

$$v_{bc} = \frac{d_2}{\Delta \tau_{s2}} \quad (12)$$

$$v_{cd} = \frac{d_3}{\Delta \tau_{s3}} \quad (13)$$

$$v_{ac} = \frac{d_1 + d_2}{\Delta \tau_{s1} + \Delta \tau_{s2}} \quad (14)$$

$$v_{bd} = \frac{d_2 + d_3}{\Delta \tau_{s2} + \Delta \tau_{s3}} \quad (15)$$

$$v_{ad} = \frac{d_1 + d_2 + d_3}{\Delta \tau_{s1} + \Delta \tau_{s2} + \Delta \tau_{s3}} \quad (16)$$

The acceleration/deceleration of the passing vehicle can be estimated using a variety of expressions. Two examples are:

$$\alpha_1 = \frac{\Delta v}{\Delta t} = \frac{v_{bc} - v_{ab}}{\Delta \tau_{s1} + \Delta \tau_{s2}} \quad (17)$$

$$\alpha_2 = \frac{\Delta v}{\Delta t} = \frac{v_{cd} - v_{bc}}{\Delta \tau_{s2} + \Delta \tau_{s3}} \quad (18)$$

Several different types of average speed can be estimated using groups of the various speed estimates. Some possibilities are the following:

$$v = \frac{v_{ab} + v_{bc} + v_{cd}}{3} \quad (19)$$

$$v = \frac{v_{ab} + v_{bc} + v_{cd} + v_{ac} + v_{bd} + v_{ad}}{6} \quad (20)$$

It is also possible to calculate a weighted speed average:

$$v = Av_{ab} + Bv_{bc} + Cv_{cd} + Dv_{ac} + Ev_{bd} + Fv_{ad} \quad (21)$$

where:

A, B, C, D, E, and F are weighted constants or functions.

Another set of information about the moving vehicle can be generated using information recorded corresponding to the rear of the vehicle. Combining the two sets of data generates a more precise analysis of the vehicle's moving behavior.

Figure 17:
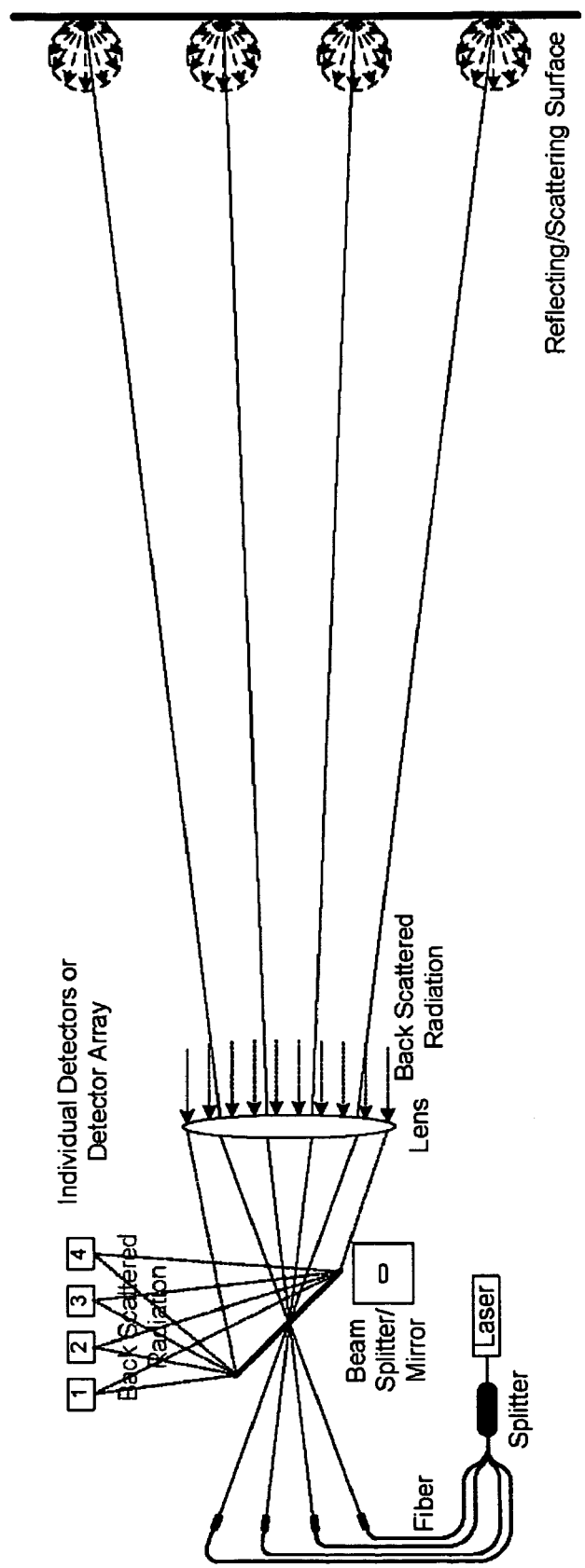
FIG. 17 illustrates a Single Lens Laser system for a four-laser beam sensor system using only one laser and a beam splitter with one hole.
Figure 18:
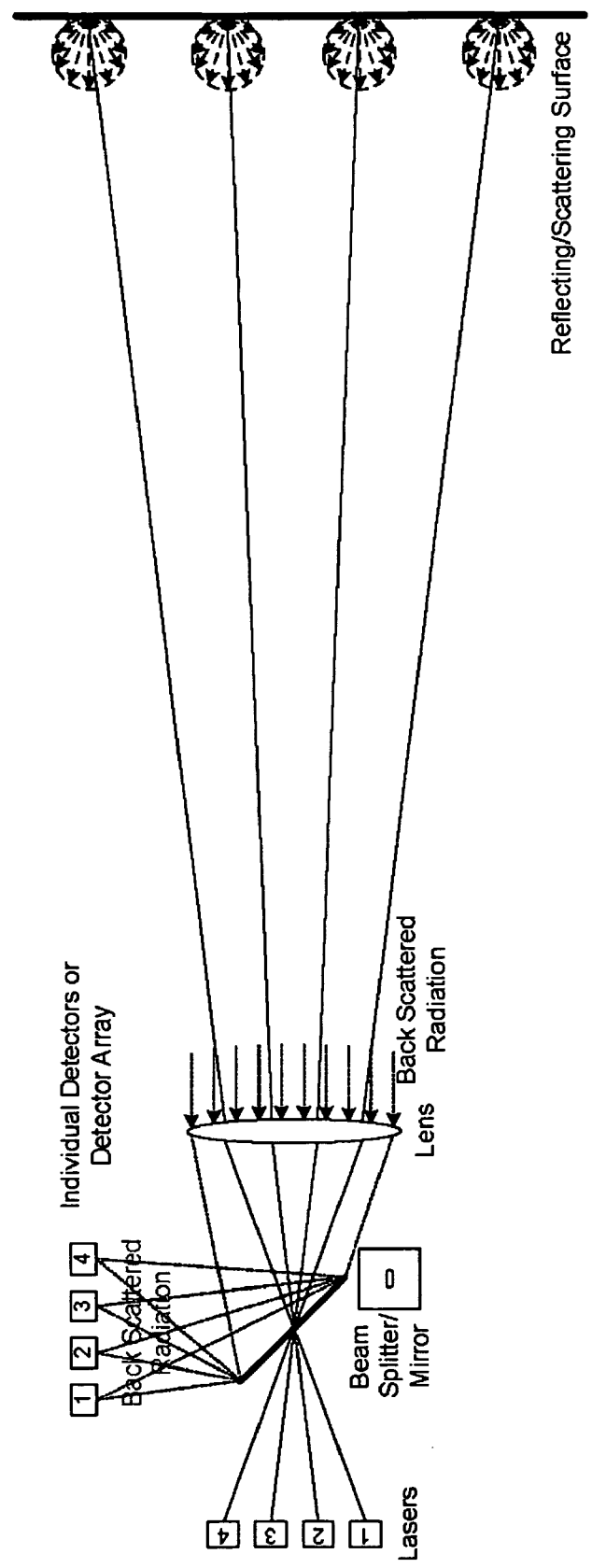
FIG. 18 illustrates a Single Lens Laser system for a four-laser beam sensor system using four lasers and a beam splitter with one hole.
Figure 19:
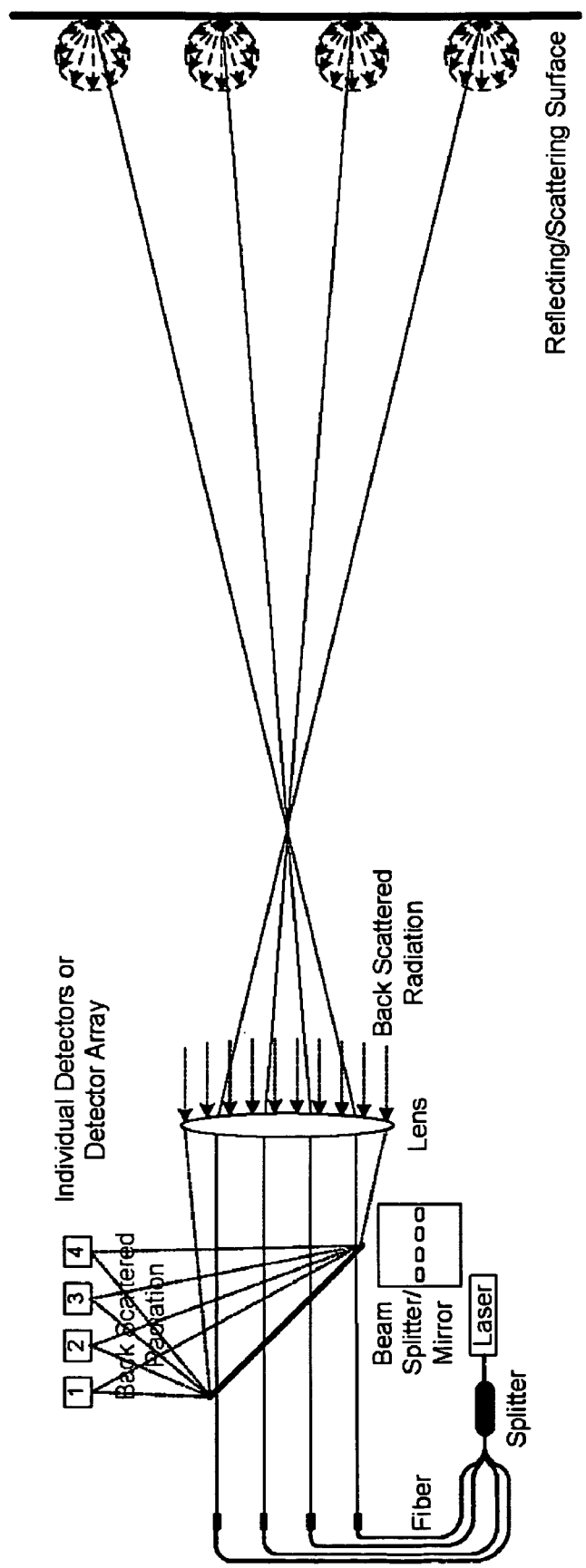
FIG. 19 illustrates a Single Lens Laser system for a four-laser beam sensor system using one laser and a beam splitter with four holes.
Figure 20:
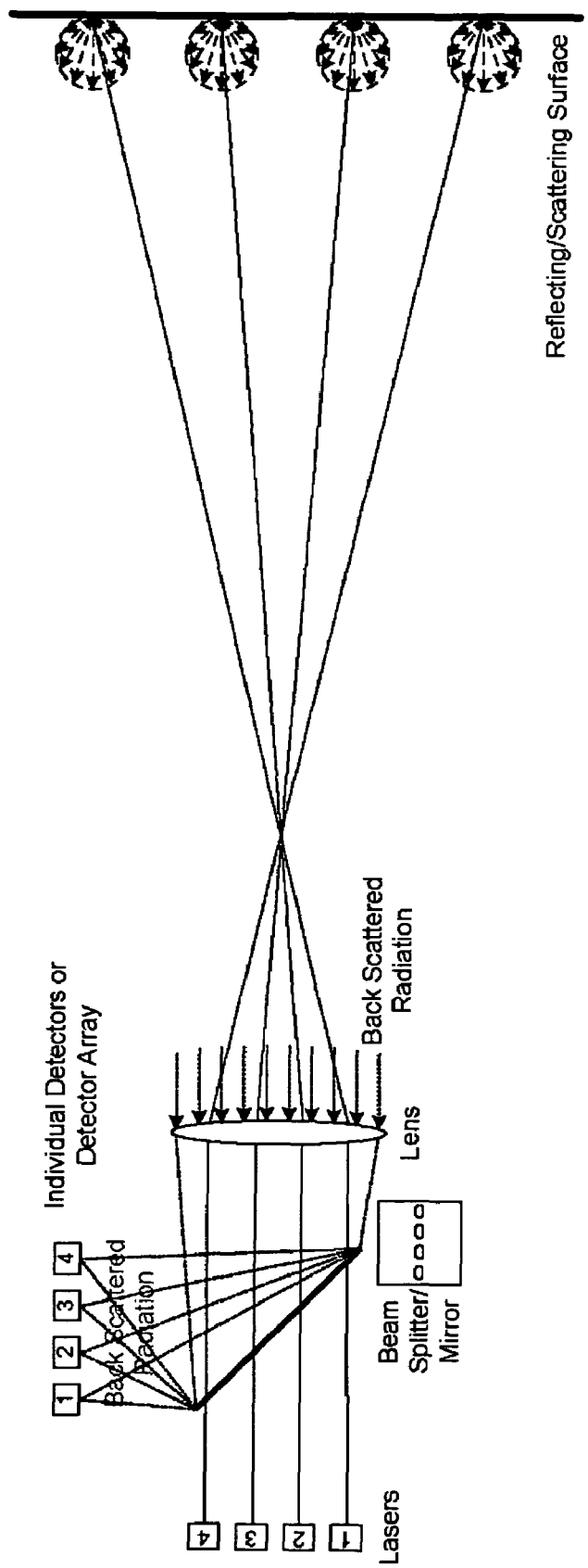
FIG. 20 illustrates a Single Lens Laser system for a four-laser beam sensor system using four lasers and a beam splitter with four holes.

Four variations of the optical arrangements of the four-laser beam sensor system are shown in FIGS. 17, 18, 19, and 20. FIG. 17 displays a four-laser beam sensor system using only one fiber-coupled laser, which is split into four parts and a mirror with one hole for the laser beams to go through. Similar arrangement is shown in FIG. 18 except that four individual lasers are used. FIGS. 19 and 20 are similar since there are four holes on the mirror for the laser beams to go through. The system in FIG. 19 uses one laser split in four beams while the system of FIG. 20 uses four individual lasers.

Similar principles as the ones used to develop the two, three, and four-laser beam sensor systems can be used for a greater number of laser beams. Using more laser beams improves the system's speed accuracy, but the complexity, construction, and assembly cost of the sensor system increases.

One of the main applications for the single lens sensor is red light photo-enforcement. The simplest two-laser beam sensor has one of the laser beams vertical (or perpendicular with respect to the road surface) while the second laser beam is at a slight angle as compared to the other beam (see FIG. 5). An important system parameter is the value of "E", which represents the minimum height for detection. Below this height, no vehicle detection is possible. In terms of time delay, there will be no measurement unless there is a decrease in the recorded time delay that corresponds to a height greater than E.

Figure 21:
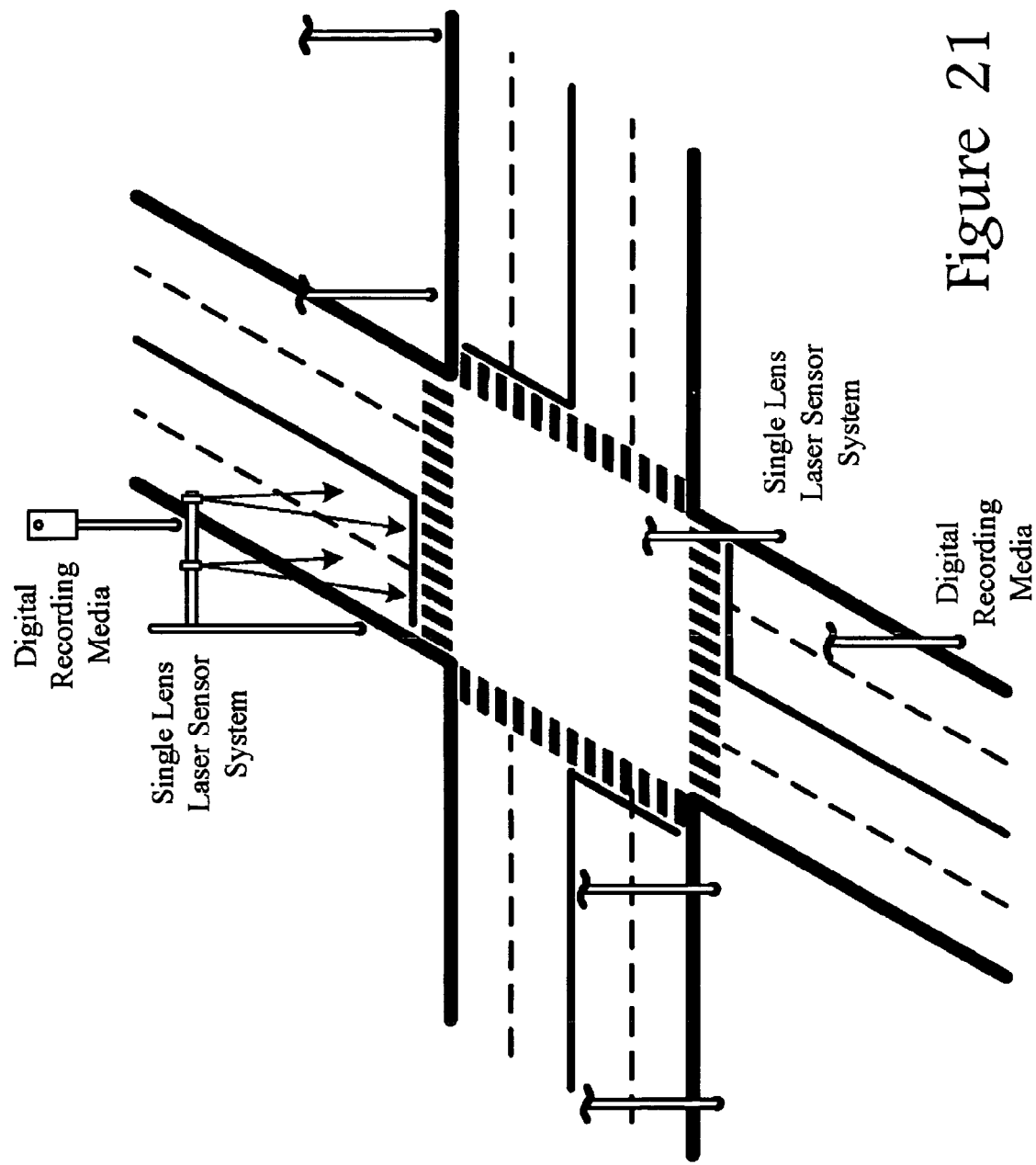
FIG. 21 illustrates schematic views of monitoring and violation detection system positioning options according to various embodiments of the present invention.

The use of the sensor for red light photo-enforcement is schematically predicted in FIG. 21. The sensors are installed above the street surface and close to the intersection for monitoring the speed of the passing vehicles Oust before entering the intersection). Information generated by the sensor is communicated through an appropriate interface to a central computer, which is located in the same cabinet as the digital recording media. The status of the traffic light is also communicated to the central computer in order to aid the decision making process.

The process of detecting and recording a traffic violation starts with sensing the status of the traffic light. When the traffic light is red, then the speed of passing vehicles is estimated. If the vehicle's speed is lower than a critical value then it means that the vehicle will be able to stop before the intersection. In this case, no image recording takes place. On the other hand, if the vehicle's speed is above a critical value then the probability of stopping before the intersection is minimum, and the process of recording the violation starts. The violation recording may consist of still images of the vehicle before and during the traffic violation as well as a short video clip documenting the violation.

Figure 22:
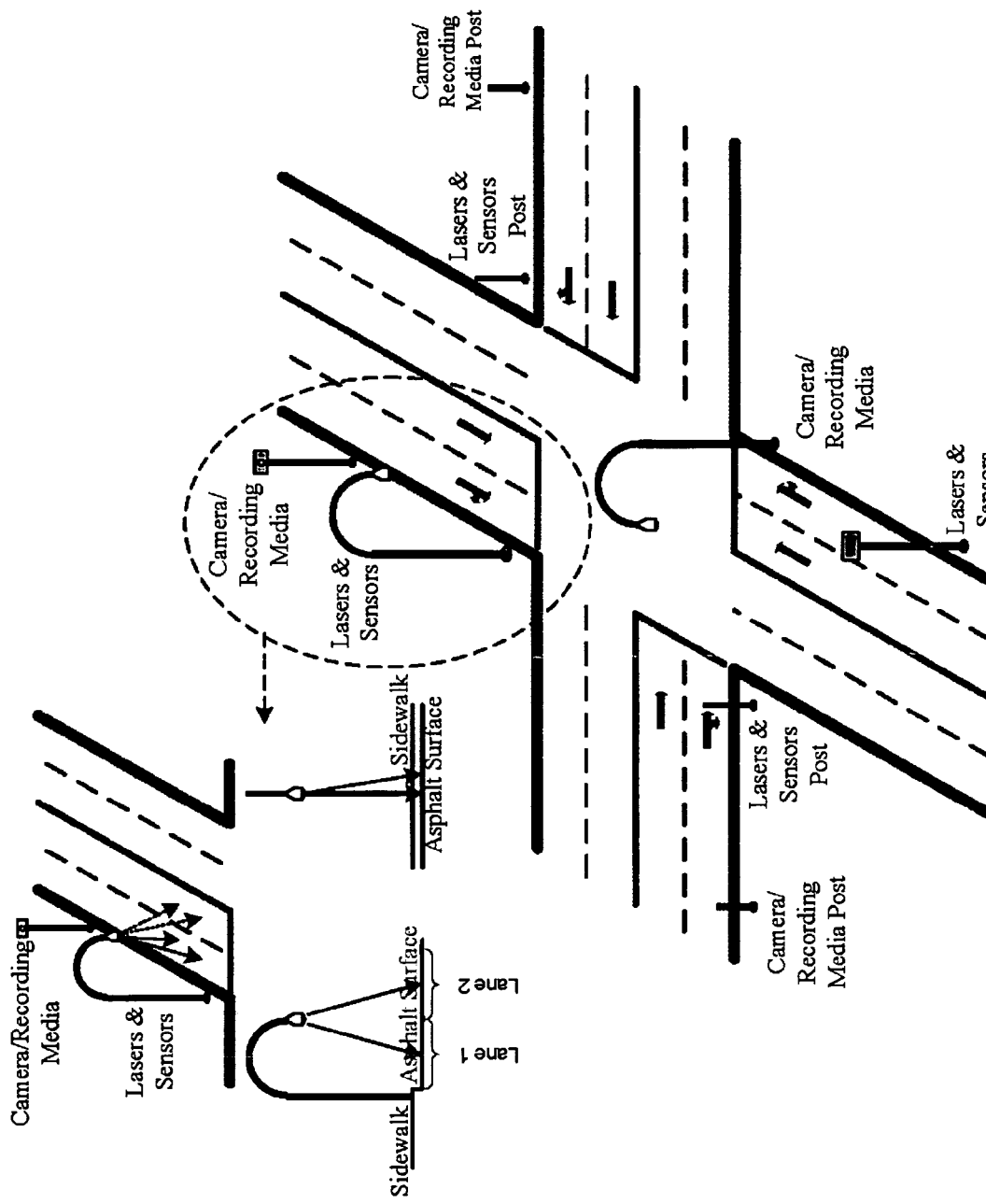
FIG. 22 illustrates typical two-lane architecture for a monitoring and violation detection system according to an embodiment of the present invention.

The compactness of the disclosed system enables multiple single lens systems to be placed in a single housing, in order to service multiple lanes. An example of a two-lane configuration using the single lens system, coupled with a recording mechanism for documenting red light violations is shown in FIG. 22. The details of the laser beam arrangement are shown in the insert (the laser beam configuration shown in FIG. 7 was used).

The exact height for placing the system is subject to local codes and laws. For convenience, during the analysis of the disclosed system, a hanging height between 16-25 feet was assumed. (According to the commercial drivers license study guide no vehicle can exceed a height of 14 feet.) Another important feature of the disclosed arrangement is aesthetic compliance. It is feasible to design a street lighting feature that would be able to house both a light bulb as well as the disclosed system.

Figure 23:
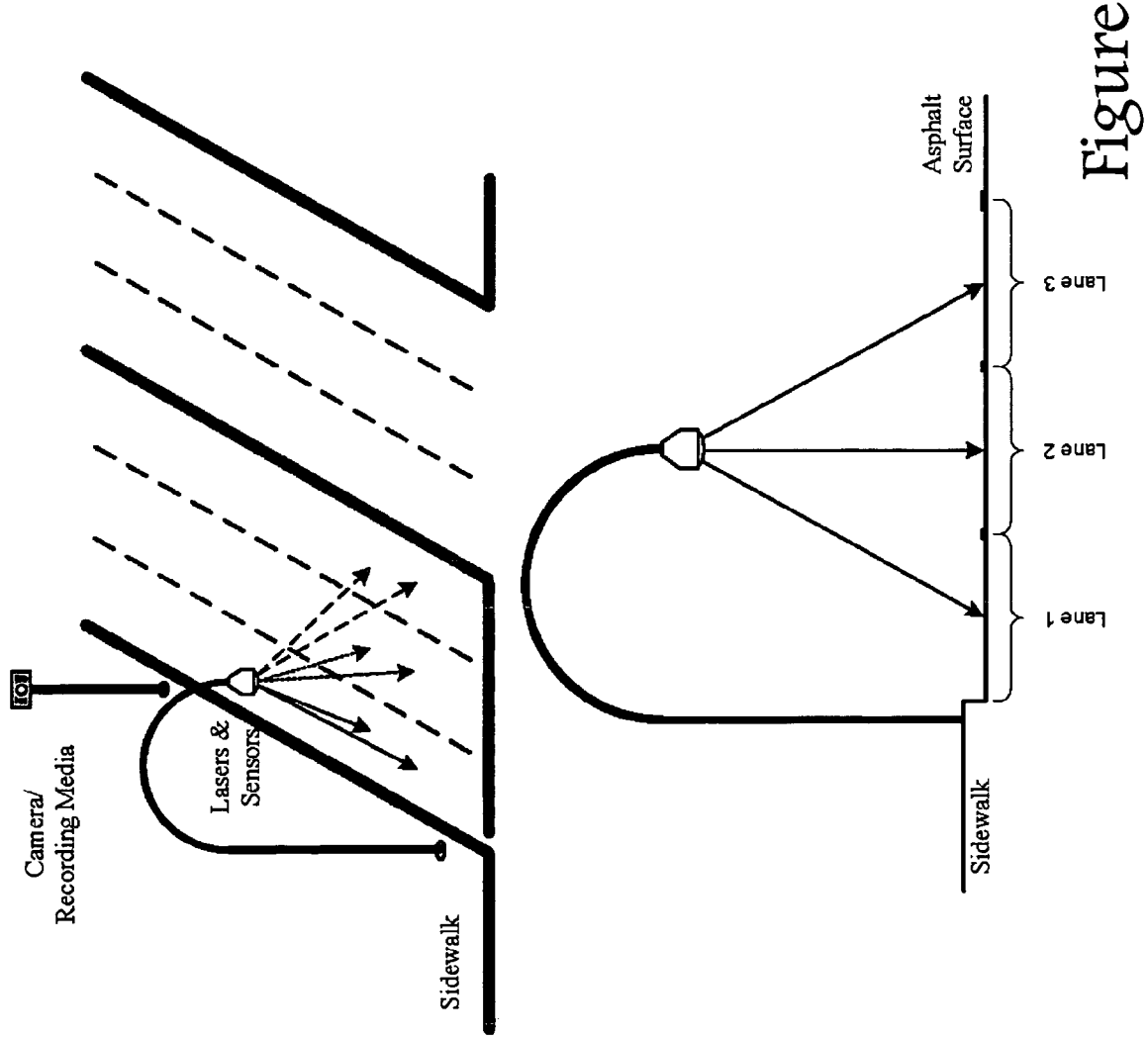
FIG. 23 illustrates typical three-lane architecture for a monitoring and violation detection system according to an embodiment of the present invention.

Similar to a two-lane configuration the disclosed single lens system can be used in a three-lane intersection. The schematic in FIG. 23 displays some of the details of the three-lane system. In the case of a four-lane intersection where all lanes need to be instrumented it is anticipated that two light-posts (one at each side of the street) will be used, each supporting a two-lane system housing.

Figure 24:
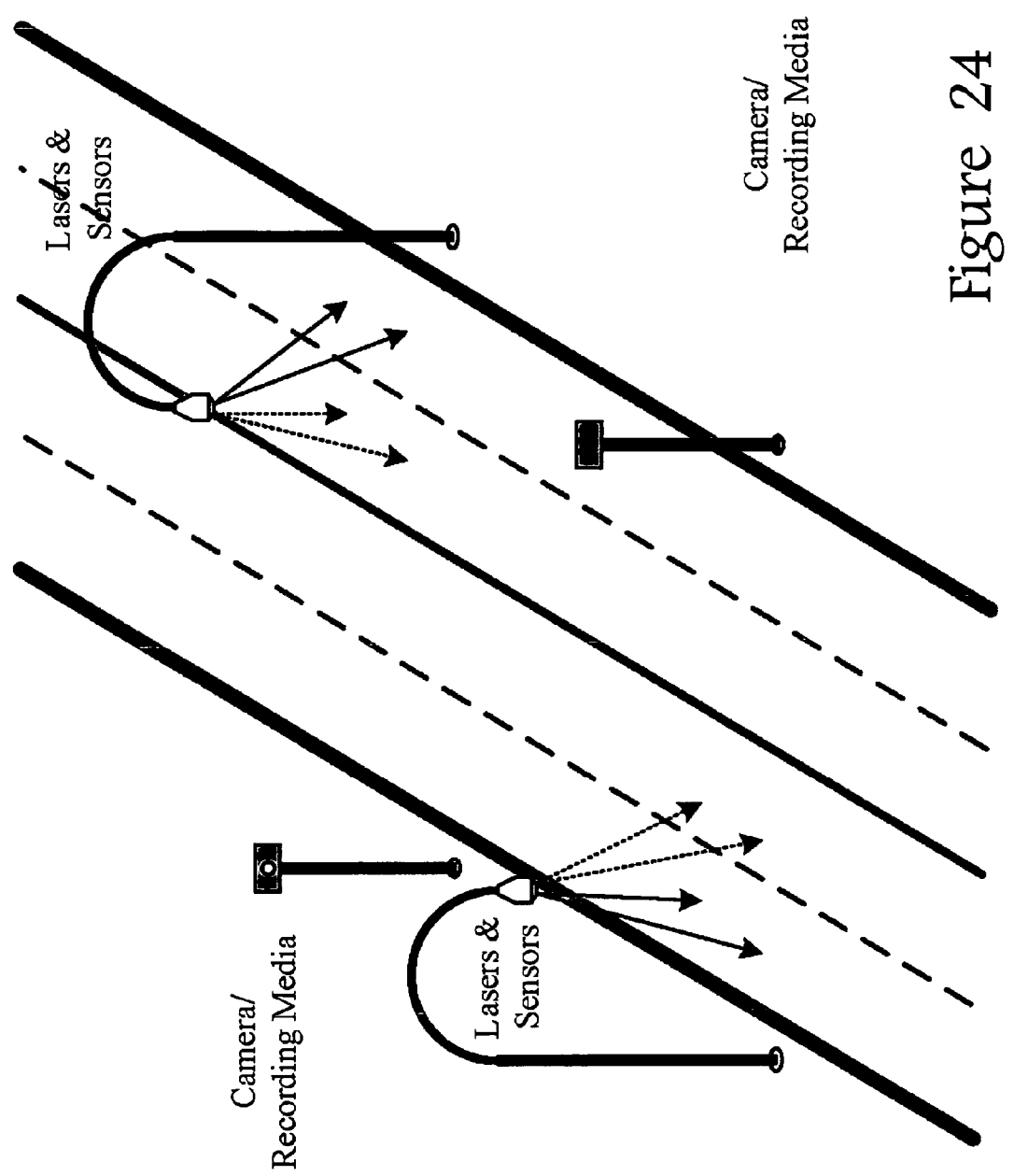
FIG. 24 illustrates typical two-lane architecture for a speed monitoring and violation detection system according to an embodiment of the present invention.

Another possible application for the disclosed single lens system is speed violation detection and speed photo enforcement in urban and rural areas as well as highways. A possible arrangement of the disclosed system in speed photo enforcement configuration is shown in FIG. 24. The speed photo enforcement system consists of a single lens system per lane and a recording mechanism. Contrary to the system dedicated for red light camera photo enforcement, no traffic light input is necessary. The algorithm for violation detection is simplified and is always on. The only criterion is whether a passing vehicle exceeds the speed limit. The systems can be strategically positioned to enforce speed limits close to street intersection or close to pedestrian street crossing. Another potential application is close to schools.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A single lens laser detector, comprising: at least one laser emitter focused through a single lens onto a surface; a controller to control radiation emission from said at least one laser emitter; at least one detector that receives at least a portion of radiation emitted from said at least one laser emitter and reflected or scattered back from said surface through said single lens to said at least one detector; and a beam splitter between said at least one laser emitter and said single lens, wherein the laser energy emitted from said at least one laser emitter is substantially co-axial in the opposite direction with the laser energy reflected or scattered back from said surface through said single lens.

2. The single lens laser detector according to claim 1, wherein said at least one laser emitter comprises a diode laser.

3. The single lens laser detector according to claim 1, said beam splitter further comprising: a mirror with at least one aperture to enable radiation from said at least one laser emitter to pass therethrough, said mirror being aligned to reflect radiation reflected or scattered back through said single lens to said at least one detector.

4. The single lens laser detector according to claim 3, wherein the size of the at least one aperture in said mirror is sized and configured such that the radiation level allowed to pass therethrough is eye-safe.

5. The single lens laser detector according to claim 1, further comprising: a fiber-optic beam splitter to split the emission from said at least one laser emitter into a plurality of paths; and said beam splitter comprises a mirror with a plurality of holes, the number of holes corresponding to the number of paths of laser emission, said mirror being aligned to reflect radiation reflected or scattered back through said single lens to said at least one detector.

6. The single lens laser detector according to claim 5, wherein each path of laser emission is focused on different points on said surface, and wherein the points are separated by a known distance.

7. The single lens laser detector according to claim 1, further comprising: a fiber-optic beam splitter to split the emission from said at least one laser emitter into a plurality of paths; and said beam splitter comprises a mirror with a single hole, such that all said plurality of paths of laser emission pass through said single hole, said mirror being aligned to reflect radiation reflected or scattered back through said single lens to said at least one detector.

8. The single lens laser detector according to claim 7, wherein each path of laser emission is focused on different points on said surface, and wherein the points are separated by a known distance.

9. The single lens laser detector according to claim 1, further comprising: a processor operationally attached to said at least one controller and said at least one detector, wherein said at least one detector provides a signal upon receiving said radiation reflected or scattered back from said surface, wherein said processor analyzes the received signal and provides an output; and a recording device that receives output from said processor.

10. The single lens laser detector according to claim 9, said processor further comprising: at least one time delay counter to measure the time from radiation transmission by said at least one laser emitter to radiation detection by said at least one detector.

11. The single lens laser detector according to claim 9, wherein said processor determines if an object is present on said surface.

12. The single lens laser detector according to claim 11, further comprising: a plurality of laser emitters; and a plurality of detectors wherein said processor calculates the speed of said object based upon time intervals between detections of said radiation reflected or scattered back from said surface by at least two detectors chosen from the plurality of detectors.

13. The single lens laser detector according to claim 12, wherein said processor generates a height profile on the object on said surface.

14. The single lens laser detector according to claim 13, wherein said processor estimates the speed of said object using cross-correlation analysis of the height profile.

15. A method of determining the presence and speed of an object along a path, comprising: providing at least one laser emitter focused through a single lens onto a surface; a controller to control radiation emission from said at least one laser emitter; at least one detector that receives at least a portion of radiation emitted from said at least one laser emitter and reflected or scattered back from said surface through said single lens to said at least one detector; and a beam splitter between said at least one laser emitter and said single lens, wherein the laser energy emitted from said at least one laser emitter is substantially co-axial in the opposite direction with the laser energy reflected or scattered back from said surface through said single lens.

16. The method according to claim 15, wherein said at least one laser emitter comprise diode lasers.

17. The method according to claim 15, wherein said beam splitter further comprising: a mirror with at least one aperture to enable radiation from said at least one laser emitter to pass therethrough, said mirror being aligned to reflect radiation reflected or scattered back through said single lens to said at least one detector.

18. The method according to claim 17, wherein the size of the at least one aperture in said mirror is sized and configured such that the radiation level allowed to pass therethrough is eye-safe.

19. The method according to claim 15, further comprising: providing a fiber-optic beam splitter to split the emission from said at least one laser emitter into a plurality of paths; and said beam splitter comprises a mirror with a plurality of holes, the number of holes corresponding to the number of paths of laser emission, said mirror being aligned to reflect radiation reflected or scattered back through said single lens to said at least one detector.

20. The method according to claim 19, wherein each path of laser emission is focused on different points on said surface, and wherein the points are separated by a known distance.

21. The method according to claim 15, further comprising: providing a fiber-optic beam splitter to split the emission from said at least one laser emitter into a plurality of paths; and said beam splitter comprises a mirror with a single hole, such that all said plurality of paths of laser emission pass through said single hole, said mirror being aligned to reflect radiation reflected or scattered back through said single lens to said at least one detector.

22. The method according to claim 21, wherein each path of laser emission is focused on different points on said surface, and wherein the points are separated by a known distance.

23. The method according to claim 15, further comprising: providing a processor operationally attached to said at least one controller and said at least one detector, wherein said at least one detector provides a signal upon receiving said radiation reflected or scattered back from said surface, wherein said processor analyzes the received signal and provides an output; and a recording device that receives output from said processor.

24. The method according to claim 23, said processor further comprising: at least one time delay counter to measure the time from radiation transmission by said at least one laser emitter to radiation detection by said at least one detector.

25. The method according to claim 23, wherein said processor determines if an object is present on said surface.

26. The method according to claim 25, further comprising: providing a plurality of laser emitters, and a plurality of detectors wherein said processor calculates the speed of said object based upon time intervals between detections of said radiation reflected or scattered back from said surface by at least two detectors chosen from the plurality of provided detectors.

27. The method according to claim 26, wherein said processor generates a height profile on the object on said surface.

28. The method according to claim 27, wherein said processor estimates the speed of said object using cross-correlation analysis of the height profile.

* * * * *